United States Patent
Nomi et al.

(10) Patent No.: US 11,281,937 B2
(45) Date of Patent: Mar. 22, 2022

(54) DATA ANALYZING DEVICE AND DATA ANALYZING METHOD

(71) Applicant: Keyence Corporation, Osaka (JP)

(72) Inventors: Taiga Nomi, Osaka (JP); Yasunobu Umehara, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 489 days.

(21) Appl. No.: 16/507,058

(22) Filed: Jul. 10, 2019

(65) Prior Publication Data
US 2020/0050888 A1   Feb. 13, 2020

(30) Foreign Application Priority Data
Aug. 7, 2018   (JP) .............................. JP2018-148303

(51) Int. Cl.
*G06K 9/62* (2006.01)
*G06K 9/68* (2006.01)

(52) U.S. Cl.
CPC ........... *G06K 9/6223* (2013.01); *G06K 9/623* (2013.01); *G06K 9/6256* (2013.01); *G06K 9/6892* (2013.01)

(58) Field of Classification Search
CPC .... G06K 9/6223; G06K 9/623; G06K 9/6256; G06K 9/6892; G06K 9/6232; G06K 9/6254; G06K 9/6262; G06F 16/00
See application file for complete search history.

(56) References Cited

U.S. PATENT DOCUMENTS

2006/0179019 A1*   8/2006   Bradski .................. G06N 20/00
                                                              706/20
2016/0232213 A1*   8/2016   Morinaga .......... G06Q 30/0201

OTHER PUBLICATIONS

U.S. Appl. No. 16/507,062, filed Jul. 10, 2019 (80 pages).
U.S. Appl. No. 16/507,063, filed Jul. 10, 2019 (112 pages).
U.S. Appl. No. 16/507,064, filed Jul. 10, 2019 (134 pages).
U.S. Appl. No. 16/507,066, filed Jul. 10, 2019 (133 pages).
Samorani, et al., "A Randomized Exhaustive Propositionalization Approach for Molecule Classification," INFORMS Journal on Computing, vol. 23, No. 3, Aug. 31, 2010 (27 pages).

* cited by examiner

*Primary Examiner* — Dakshesh D Parikh
(74) *Attorney, Agent, or Firm* — Kilyk & Bowersox, P.L.L.C.

(57) ABSTRACT

A data analyzing device generates a diagram that shows a relationship between a first feature and an objective variable. The first feature is selected in accordance with an input of a user from among features having higher degrees of importance. The data analyzing device divides analysis target data into a plurality of clusters on the basis of values of the first feature, calculates a representative value of the objective variable of each of the clusters, extracts a second feature having a representative value of the objective variable, which is determined as having a significant difference relative to the representative value of the objective variable of the first feature, from at least one of the clusters. The data analyzing device generates a diagram that shows a relationship between the second feature and the objective variable.

13 Claims, 23 Drawing Sheets

FIG. 6 master.csv

| CUSTOMER ID | AGE | GENDER | ALIENATION |
|---|---|---|---|
| 1 | 20~29 | MALE | 1 |
| 2 | 50~59 | FEMALE | 0 |
| 3 | 30~39 | FEMALE | 1 |
| ... | ... | ... | ... | transaction.csv

| CUSTOMER ID | DATE | CATEGORY | PRICE |
|---|---|---|---|
| 1 | 2018/01/01 | VEGETABLE | 200 |
| 1 | 2018/01/01 | MEAT | 400 |
| 1 | 2018/01/12 | DAILY DELIVERY PRODUCT | 300 |
| 1 | 2018/01/18 | PROCESSED FOOD | 500 |
| 1 | 2018/01/18 | DAILY DELIVERY PRODUCT A | 300 |
| 1 | 2018/01/18 | DAILY DELIVERY PRODUCT | 100 |
| 1 | 2018/01/25 | VEGETABLE | 100 |
| 1 | 2018/01/25 | VEGETABLE | 100 |
| 1 | 2018/01/26 | MEAT | 200 |
| 1 | 2018/01/27 | PROCESSED FOOD | 600 |
| 2 | 2018/01/21 | DAILY DELIVERY PRODUCT | 100 |
| 2 | 2018/01/21 | DAILY DELIVERY PRODUCT | 200 |
| ... | ... | ... | ... |

FIG. 24

EXAMPLE) IN A CASE OF y = 3x1 − 2x2 + 1

| COEFFICIENT | |
|---|---|
| a1 | 3 |
| a2 | −2 |
| b | 1 |

| DATA | |
|---|---|
| x1 | x2 |
| 1 | 3 |
| −1 | 4 |
| 0 | −1 |
| 1 | −1 |

⇑

PREDICTION
a1x1+a2x2+b

| y |
|---|
| 0 |
| 0 |
| 0 |
| 0 |

DEGREE OF CONTRIBUTION

| a1x1 | a2x2 |
|---|---|
| x1 | x2 |
| 0 | 0 |
| 0 | 0 |
| 0 | 0 |
| 0 | 0 |

| AVERAGE |
|---|
| 0 |
| 0 |

DATA ANALYZING DEVICE AND DATA ANALYZING METHOD

CROSS-REFERENCE TO RELATED APPLICATIONS

The present application claims foreign priority based on Japanese Patent Application No. 2018-148303, filed Aug. 7, 2018, the contents of which is incorporated herein by reference.

BACKGROUND OF THE INVENTION

1. Field of the Invention

The present invention relates to a data analyzing device and a data analyzing method.

2. Description of Related Art

A technique for trying to acquire a useful unknown knowledge from a large volume of information, generally called "data mining", is conventionally known. A typical method of data mining involves a pre-processing step, a feature extracting step, a model learning step, and a post-processing step that are sequentially executed. In the pre-processing step, operations such as collecting data necessary for analysis, and removing unnecessary noise from the data and filling a missing item to improve the efficiency of the analysis are performed. These operations are collectively referred as "ETL (extract, transform, and load)". In the feature extracting step, a feature that exists in the original data is manipulated to generate a new feature more useful for the analysis. In the model learning step, data that is prepared in the pre-processing step and the feature extracting step is input to a machine learning algorithm to obtain an analysis result. In the post-processing step, the analysis result obtained in the model learning step is subjected to a process such as outputting it to an external device or generating a report based thereon.

To design an optimal feature, trial and error by an experienced analyst is necessary, resulting in taking a long time to analyze data. In response to this situation, a technique is disclosed in, for example, "A Randomized Exhaustive Propositionalization Approach for Molecule Classification" (INFORMS Journal on Computing, Vol. 23, No. 3 Published Aug. 31, 2010). This known technique performs automatic generation of a new feature from data.

The technique disclosed in such a literature involves comprehensively applying a preliminarily defined series of arithmetic operators, such as a plus (+) operator, a minus (−) operator, a multiplication (x) operator, and a division (÷) operator, to an original feature, thereby automatically generating a large amount of new features.

Thus, the technique as disclosed in the above-described literature produces an enormous amount of new features as a result of using a plurality of arithmetic operators in combination. The enormous amount of the features include a large volume of features that are not effective for the analysis, thereby causing long time calculation in the subsequent model learning step.

Although a new feature useful for improving accuracy of the analysis is generated, it is hard to intuitively understand a relationship between the generated feature and an objective variable and a relationship between the generated feature and another feature, and therefore, additional analyzing work with respect to each feature is required in order to acquire a knowledge from an analysis result in actual cases. That is, even when the technique as disclosed in the above-described literature is used, manual work by an analyst is required in the end in order to acquire a useful knowledge. Thus, there is still a problem of taking time to analyze data.

SUMMARY OF THE INVENTION

The present invention has been achieved in view of these circumstances, and an object of the present invention is to enable displaying a feature with a high degree of importance from among features obtained from a large volume of data, thereby facilitating acquiring a new knowledge.

To achieve the above-described object, a first aspect of the invention provides a data analyzing device for analyzing analysis target data. The data analyzing device includes a data input unit, a prediction model generating unit, an importance degree calculating unit, a display unit, a basic diagram generating unit, a derived diagram generating unit. The data input unit receives an input of analysis target data including a plurality of features and an objective variable. The prediction model generating unit generates a prediction model for predicting the objective variable from the plurality of features. The importance degree calculating unit calculates a degree of importance of each of the plurality of features relative to prediction using the prediction model. The display unit displays features having higher degrees of importance on a basis of the degrees of importance calculated by the importance degree calculating unit. The basic diagram generating unit generates a basic diagram that shows a relationship between a first feature and the objective variable. The first feature is selected in accordance with an input of a user from among the features displayed on the display unit. The derived diagram generating unit generates at least one of a first derived diagram, a second derived diagram, and a third derived diagram. The first derived diagram shows a relationship between a second feature and the objective variable. The second feature is selected as follows: the analysis target data is divided into a plurality of clusters on the basis of values of the first feature, a representative value of the objective variable of each of the clusters is calculated, and a second feature having a representative value of the objective variable, which is determined as having a significant difference relative to the representative value of the objective variable of the first feature, is extracted from at least one of the clusters. The second derived diagram shows a feature that contributes to prediction of the objective variable in a predetermined cluster among the plurality of clusters. The third derived diagram shows a comparison of accuracy between a prediction model generated based on the first feature and a prediction model generated based on another feature belonging in the same category as the first feature and having an accumulation period different from that of the first feature. The display unit is configured to display the basic diagram generated by the basic diagram generating unit and the derived diagram generated by the derived diagram generating unit.

In this structure, in response to an input of the analysis target data, a prediction model for predicting an objective variable from a plurality of features included in the analysis target data is generated. The feature may be originally included in the analysis target data or may be newly generated. The degree of importance relative to prediction using the prediction model is calculated with respect to each of the plurality of features, and a feature having a higher degree of importance among the plurality of features having the calculated degrees of importance is displayed on the display unit. At this time, a feature having a lower degree of importance may also be displayed. In any cases, a user is able to understand the feature having the high degree of importance while differentiating the feature having the high degree of importance from the feature having the low degree of importance by viewing the display unit. When a user selects any feature from among the features displayed on the display unit, a basic diagram showing a relationship between the selected first feature and the objective variable is generated and is displayed on the display unit. Moreover, the display unit displays any one of the first derived diagram, the second derived diagram and the third derived diagram, which are described below.

That is, when the derived diagram generating unit generates the first derived diagram, for example, a first feature of which values are divided into a plurality of intervals is obtained, and a representative value, such as an average or a median, of an objective variable of each interval is calculated. Then, a second feature having a representative value of the objective variable, which has a significant difference relative to the representative value of the objective variable of the first feature, is extracted from any of the intervals. A relationship between this second feature and the objective variable is thus shown. This provides a knowledge that is hard to acquire only by using the first feature. The interval is a condition for dividing the analysis target data, and the interval may be, for example, gender, place, or another element, instead of period.

When the derived diagram generating unit generates the second derived diagram, for example, in the condition in which the analysis target data is divided into clusters of "Male" and "Female", the degree of contribution to the prediction of the objective variable may greatly vary depending on gender. Showing such a feature that contributes to the prediction of the objective variable provides a new knowledge.

In the case in which the derived diagram generating unit generates the third derived diagram, it is possible to compare the accuracy of the prediction model predicted based on another feature with the accuracy of the prediction model generated based on the first feature. The another feature belongs to the same category as the first feature and has an accumulation period different from that of the first feature. Thus, the user understands the relative difference in the accuracy of the prediction models, thereby easily determining which prediction model should be used to increase the accuracy. The features in the same kind or class may be used as those belonging to the same category. For example, although dates are different, the dates may belong to the same category if the category is "period". In another example, although the lengths of periods of days differ, the days may belong to the same category if the category is "period". In yet another example, male and female may belong to the same category if the category is "gender".

Any one of the first derived diagram, the second derived diagram, and the third derived diagram, and the basic diagram may be displayed on the display unit at the same time or at different times. All of the first derived diagram, the second derived diagram, and the third derived diagram may be generated, and the order of generation is not particularly limited. In addition, all of the first derived diagram, the second derived diagram, and the third derived diagram may be displayed on the display unit at the same time. The "diagram" may include a graph, a table, and characters.

According to a second aspect of the invention, the display unit may be configured to display a plurality of features having higher degrees of importance in the order of higher degree of importance.

This structure allows displaying ranking of the plurality of features having higher degrees of importance, thereby enabling the user to relatively compare the degrees of importance of the plurality of features. The direction of arranging the features in the order of higher degree of importance may be, for example, an up-down direction or a left-right direction as viewed from the user.

According to a third aspect of the invention, the display unit may be configured to display a feature having a highest degree of importance and a plurality of features having degrees of importance less than the highest degree of importance, at the same time.

This structure enables easy understanding of the feature having the highest degree of importance among the features and the difference of the highest degree of importance from the degree of importance less than the highest degree of importance.

According to a fourth aspect of the invention, the derived diagram generating unit may enable, at the time of generating the third derived diagram, comparing accuracies of prediction models respectively generated based on the plurality of other features with the accuracy of the prediction model generated based on the first feature.

This structure enables, in a case in which there are a plurality of other features belonging to the same category as the first feature and having accumulation periods different from that of the first feature, a user to compare accuracies of a plurality of prediction models respectively generated based on the plurality of other features and the accuracy of the prediction model generated based on the first feature while these accuracies are displayed on the display unit. Thus, in the case in which there are a plurality of features belonging to the same category, which feature should be used in analysis is easily determined.

According to a fifth aspect of the invention, the derived diagram generating unit may enable, at the time of generating the third derived diagram, comparing an accuracy of a prediction model generated based on the another feature having a degree of importance equal to or greater than a predetermined value with the accuracy of the prediction model generated based on the first feature.

Basically, a feature having a low degree of importance is not useful in analysis in many cases. Thus, comparing an accuracy of a prediction model generated based on such a feature with an accuracy of a prediction model generated based on the first feature is not helpful depending on cases. On the other hand, the present invention enables comparing an accuracy of a prediction model generated based on a feature having a degree of importance equal to or greater than a predetermined value with an accuracy of the prediction model generated based on the first feature, in the condition in which a feature having a low degree of importance is excluded.

According to a sixth aspect of the invention, the derived diagram generating unit may be configured to generate a data number display graph that shows the number of pieces of data in the analysis target data belonging to each cluster, and the display unit may be configured to display the data number display graph generated by the derived diagram generating unit.

This structure enables understanding the volume of data belonging to each of a plurality of clusters that is generated by dividing the analysis target data into the plurality of clusters. Thus, a reliability of the objective variable of each of the plurality of clusters is determined. The data number display graph may be a histogram.

According to a seventh aspect of the invention, the derived diagram generating unit may be configured to notify a user of existence of a cluster having pieces of data in the analysis target data at a first predetermined number or less.

In this structure, for example, in a case in which a cluster having a greatly small number of pieces of data in the analysis target data exists, this is notified to a user. Thus, the user is able to know the existence of such a cluster, thereby improving the accuracy of analysis. The first predetermined number may be a relative number such as several percent of the total number of pieces of data.

According to an eighth aspect of the invention, the derived diagram generating unit may be configured to obtain a total accumulation period of the analysis target data and automatically divide the obtained total accumulation period into a plurality of accumulation periods.

In this structure, in a case in which the accumulation period is long, the derived diagram generating unit automatically divides the long accumulation period into a plurality of accumulation periods, thereby saving time and labor for dividing the long accumulation period by the user.

According to a ninth aspect of the invention, the derived diagram generating unit may be configured to determine, at the time of generating the first derived diagram, that a feature having pieces of data in the analysis target data at a second predetermined number or less has no significant difference relative to the representative value of the objective variable of the first feature.

In this structure, for example, a feature having a greatly small number of pieces of data in the analysis target data is determined as having no significant difference because such a feature tends to have a low reliability, thereby improving the accuracy of analysis. The second predetermined number may be a relative number such as several percent of the total number of pieces of data.

According to a tenth aspect of the invention, the derived diagram generating unit may be configured to generate, at the time of generating the first derived diagram, a simultaneously display graph that shows the first feature and the second feature at the same time, and the display unit may be configured to display the simultaneously display graph generated by the derived diagram generating unit.

In this structure, the first feature and the second feature are shown in the graph at the same time, and therefore, a knowledge that is hard to acquire only by using the first feature is easily obtained from the simultaneously display graph.

According to an eleventh aspect of the invention, the derived diagram generating unit may be configured to generate the second derived diagram showing the feature that contributes to the prediction of the objective variable in the predetermined cluster and the first feature of the all clusters, at the same time.

This structure enables easy determination of the degree of difference of the feature in the predetermined cluster from features in all of the clusters.

According to a twelfth aspect of the invention, the data analyzing device may further include an explanatory note automatically generating unit that automatically generate an explanatory note for explaining a relationship between the first feature and the objective variable.

In this structure, for example, an explanatory note for explaining a degree of influence of the first feature on the objective variable or other detailed information is automatically generated on the basis of information such as the name of the analysis target data received by the data input unit and the relative difference of the feature. The explanatory note enables the user to easily understand a relationship between the feature and the objective variable.

A thirteenth aspect of the invention provides a data analyzing method for analyzing analysis target data. The data analyzing method includes receiving an input of the analysis target data including a plurality of features and an objective variable, and generating a prediction model for predicting the objective variable from the plurality of features, calculating a degree of importance of each of the plurality of features relative to prediction using the prediction model, displaying features having higher degrees of importance on a basis of the calculated degrees of importance, generating a basic diagram that shows a relationship between a first feature and the objective variable. The first feature is selected in accordance with an input of a user from among the displayed features. The data analyzing method also includes generating at least one of a first derived diagram, a second derived diagram, and a third derived diagram. The first derived diagram shows a relationship between a second feature and the objective variable. The second feature is selected as follows: the analysis target data is divided into a plurality of clusters on the basis of values of the first feature, a representative value of the objective variable of each of the clusters is calculated, and a second feature having a representative value of the objective variable, which is determined as having a significant difference relative to the representative value of the objective variable of the first feature, is extracted from at least one of the clusters. The second derived diagram shows a feature that contributes to prediction of the objective variable in a predetermined cluster among the plurality of clusters. The third derived diagram shows a comparison of accuracy between a prediction model generated based on the first feature and a prediction model generated based on another feature belonging in the same category as the first feature and having an accumulation period different from that of the first feature. The data analyzing method also includes displaying the generated basic diagram and the generated derived diagram.

The present invention enables displaying a feature having a high degree of importance included in large volume of data on the display unit. Various kinds of graphs may be displayed. The graphs include the basic diagram showing a relationship between a feature and an objective variable, the derived diagram showing a relationship between a plurality of features and an objective variable, the derived diagram showing features that contribute to prediction of an objective variable in a predetermined cluster, and the derived diagram that shows a comparison of accuracy between prediction models generated based on features that have different accumulation periods. These graphs facilitate acquiring a new knowledge.

BRIEF DESCRIPTION OF THE DRAWINGS

FIG. 6 shows analysis target data in a table format, which are respectively stored in two files;

FIG. 24 is a diagram for explaining a method of calculating the degree of contribution;

DESCRIPTION OF EMBODIMENTS

Embodiments of the present invention are explained in detail below with reference to the drawings. However, the following descriptions of the embodiments are substantially only illustrations and are not intended to limit the present invention, objects using the present invention, and use of the present invention.

Figure 1:
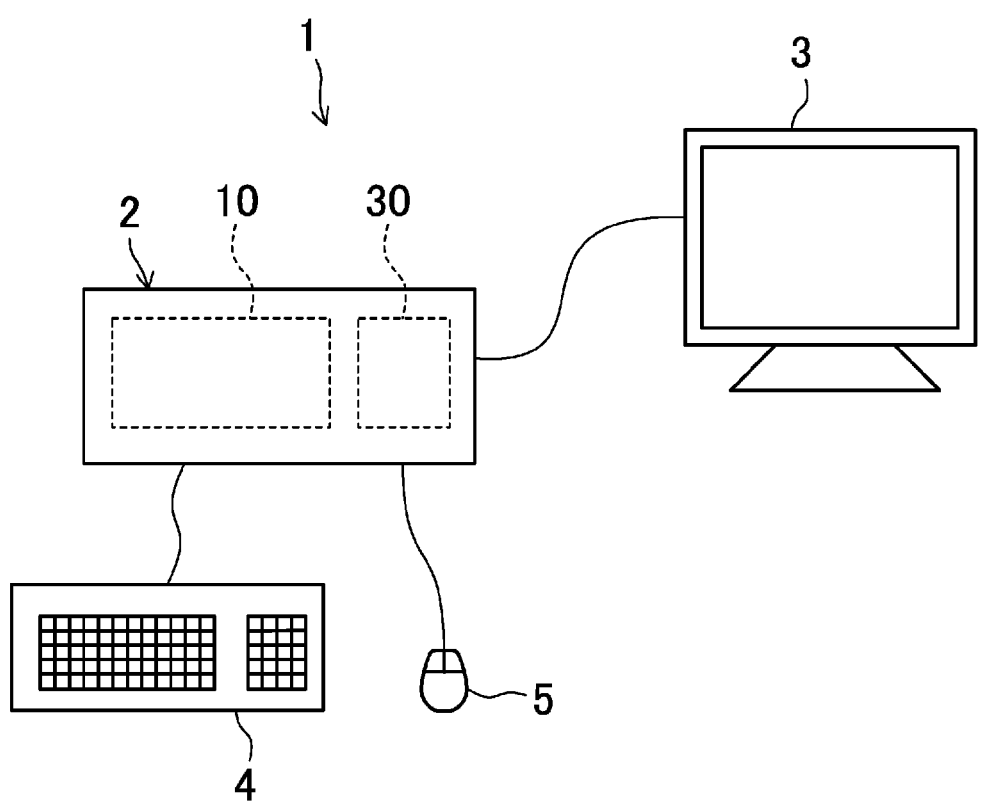
FIG. 1 shows a schematic configuration of a data analyzing device according to an embodiment of the present invention.
Figure 2:
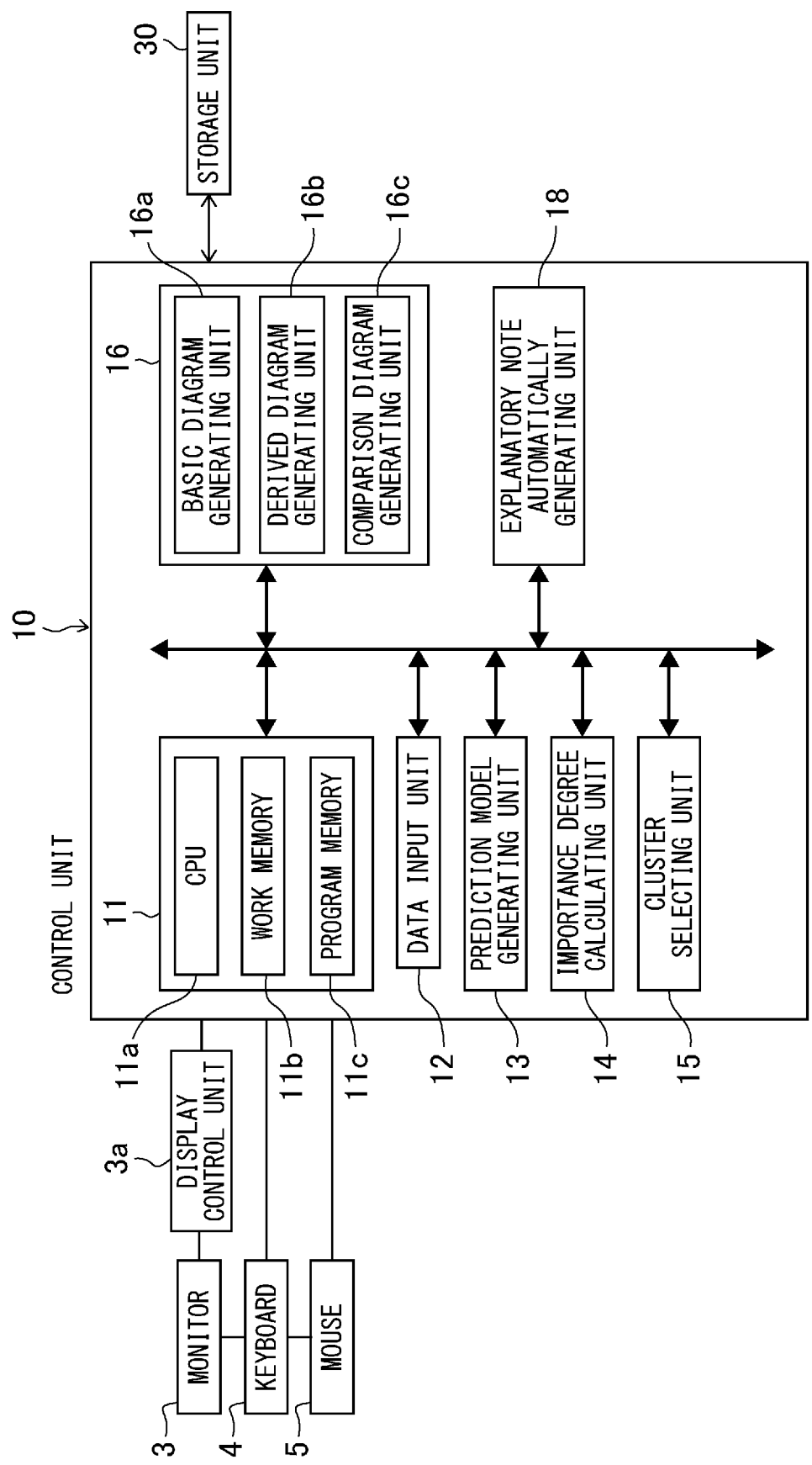
FIG. 2 is a block diagram of the data analyzing device.

FIG. 1 shows a schematic configuration of a data analyzing device 1 according to an embodiment of the present invention. FIG. 2 is a block diagram of the data analyzing device 1. The data analyzing device 1 analyzes analysis target data and is used to execute a data analyzing method according to the present invention. The data analyzing device 1 and the data analyzing method can be used in trying to acquire a useful unknown knowledge from a large volume of information, generally called "data mining".

Data Analysis Procedure

Figure 3:
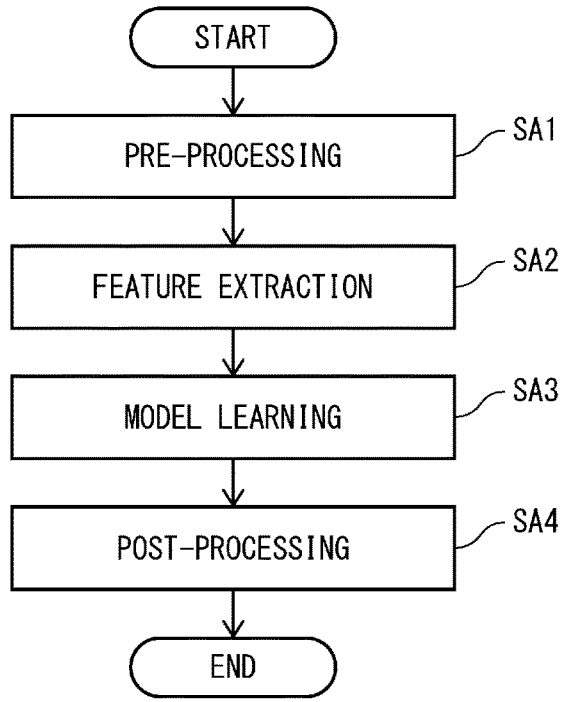
FIG. 3 is a flowchart showing a data analysis procedure.

A typical data analysis procedure is described with reference to a flowchart shown in FIG. 3. After the data analysis is started, a pre-processing step is executed in step SA1. In the pre-processing step, operations such as collecting data necessary for analysis or analysis target data, and removing unnecessary noise from the data and filling a missing item to improve the efficiency of the analysis are performed. These operations are collectively referred as "ETL (extract, transform, and load)". A feature extracting step is executed in step SA2. In the feature extracting step, a feature that exists in the original data is manipulated to generate a new feature more useful for the analysis. A model learning step is executed in step SA3. In the model learning step, data that is prepared in the pre-processing step and the feature extracting step is input to a machine learning algorithm to obtain analysis result. A post-processing step is executed in step SA4. In the post-processing step, the analysis result obtained in the model learning step is subjected to a process such as outputting it to an external device or generating a report based thereon.

Overall Configuration of Data Analyzing Device 1

As shown in FIGS. 1 and 2, the data analyzing device 1 includes a device body 2, a monitor 3, a keyboard 4, and a mouse 5. The monitor 3, the keyboard 4, and the mouse 5 are connected to the device body 2. For example, it is possible to embody the data analyzing device 1 by installing a program in a general-purpose personal computer. Alternatively, it is also possible to construct the data analyzing device 1 by dedicated hardware installed with the program. The program executes control contents, which are described later. The device body 2 and the monitor 3 may be combined into one body, or a part of the device body 2 may be incorporated to the monitor 3.

The data analyzing device 1 incorporates a communication module (not shown) and is communicable with the outside. This enables downloading data from an external server via an internet line.

The keyboard 4 and the mouse 5 are means for controlling the data analyzing device 1 and also function as other means such as a means for inputting various kinds of information and a means for performing selection operation. In addition to or instead of the keyboard 4 and the mouse 5, a touch panel input device, a voice input device, a stylus input device, or another device may also be used.

Structure of Monitor 3

The monitor 3 shown in FIG. 1 may use, for example, an organic EL display, a liquid crystal display, or another device. The monitor 3 only may be referred as a display unit or the monitor 3 in combination with a display control unit 3a may be referred as a display unit. The display control unit 3a is shown in FIG. 2. The display control unit 3a may be integrated in the monitor 3 or in the device body 2. The display control unit 3a is constituted of a component such as a display DSP for displaying an image on the monitor 3. The display control unit 3a may also include a video memory that temporarily stores image data at the time of displaying the image, such a VRAM. The display control unit 3a transmits a control signal for displaying a predetermined image, to the monitor 3 on the basis of a display instruction or a display command transmitted from a CPU 11a of a main control unit 11, which is described later. For example, the display control unit 3a also transmits control signals for displaying various kinds of user interfaces, icons, and contents operated by a user using the keyboard 4 or the mouse 5, on the monitor 3. In addition, it is also possible to display a pointer or the like that is controllable by the mouse 5, on the monitor 3.

The monitor 3 may use a touch operation panel monitor to have a function for inputting various kinds of information.

Overall Configuration of Device Body 2

The device body 2 shown in FIG. 1 includes a control unit 10 and a storage unit 30. The storage unit 30 is constituted of a hard disk drive, a solid state drive (SSD), or another component. The storage unit 30 is connected to the control unit 10 to be controlled by the control unit 10 and is able to store various kinds of data as well as read the stored data.

Control Unit 10

Although not specifically illustrated in the drawings, the control unit 10 may be constituted of an MPU, a system LSI, a DSP, a dedicated hardware, or another component. The control unit 10 has various kinds of functions as described later. These functions may be implemented by logic circuits or by executing software.

As shown in FIG. 2, the control unit 10 includes the main control unit 11, a data input unit 12, a prediction model generating unit 13, an importance degree calculating unit 14, a cluster selecting unit 15, a display diagram generating unit 16, and an explanatory note automatically generating unit 18. Each unit of the control unit 10 is described separately, but one unit may execute plural kinds of processes or each unit may be further separated so that one process will be executed by cooperative operation of these separated units.

The above-described pieces of hardware are connected to each other in a bidirectionally or unidirectionally communicable manner via an electrical communication path or wiring, such as a bus.

The main control unit 11 performs numerical calculation and information processing on the basis of respective programs and also performs control of each piece of hardware. The main control unit 11 includes the CPU 11a, a work memory 1lb, such as a RAM, and a program memory 11c, such as a ROM, a flash ROM, or an EEPROM. The CPU 11a functions as a central processing unit. The work memory 11b functions as a work area when the main control unit 11 executes various kinds of programs. The program memory 11c stores information such as a startup program and an initialization program.

Figure 5:
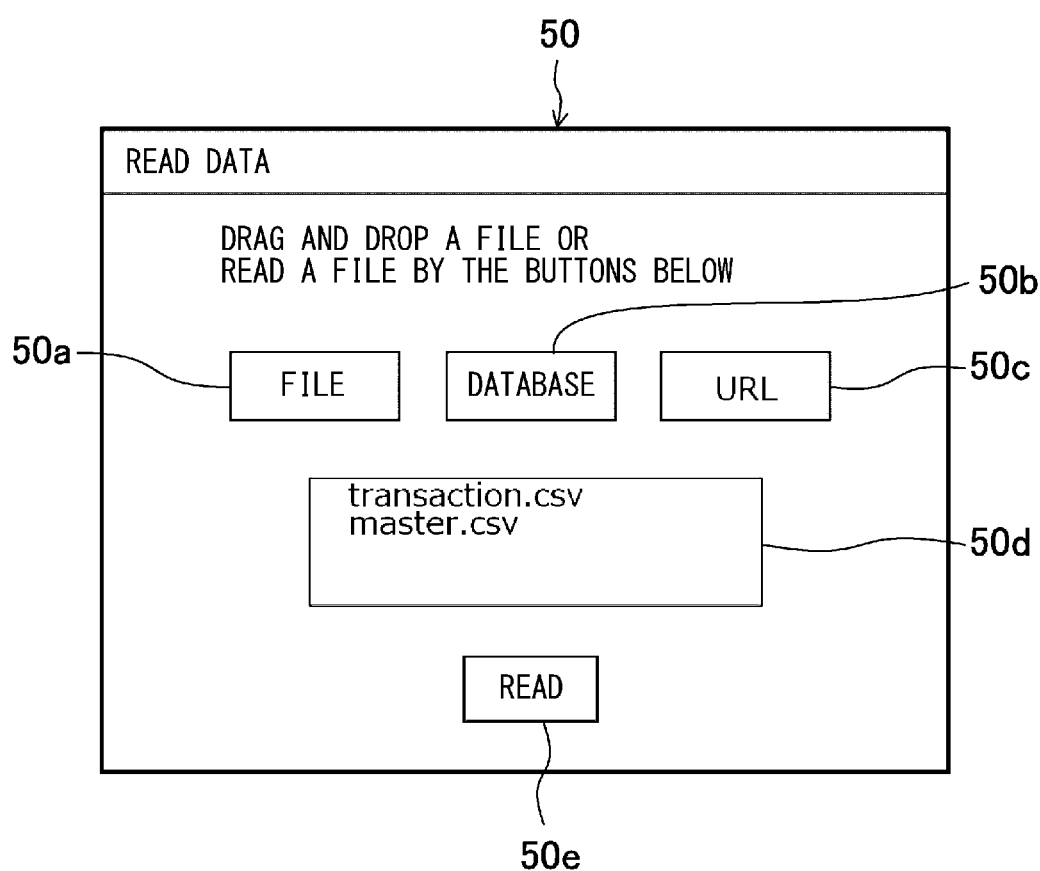
FIG. 5 shows a data input user interface.

The data input unit 12 receives an input of analysis target data including a plurality of features and an objective variable. The data input unit 12 displays a data input user interface 50 as shown in FIG. 5, on the monitor 3 and receives an operation of a user, which is performed on the data input user interface 50. The operation of the user includes an operation on the keyboard 4 and an operation on the mouse 5, such as clicking a button, dragging and dropping, and rotating a wheel.

The analysis target data includes a plurality of features and an objective variable. The plurality of features are data including one or plural kinds of features, such as one originally existing in the analysis target data (existing feature), one implicit in the analysis target data although not noticed by the user (potential feature), and one newly generated (new feature). The analysis target data may be partially missed. In this case, operation for filling the missing item may be performed as described later.

The data input user interface 50 shown in FIG. 5 is provided with a file selection button 50a, a database selection button 50b, a URL designation button 50c, a database display region 50d, and a reading start button 50e. Each the buttons is freely layout.

For example, in a case in which a file including analysis target data is stored in an external storage device or the storage unit 30, and the file is on a desktop or in an open file, the user drags and drops the file to the database display region 50d. Thus, the name of the file including the analysis target data is displayed in the database display region 50d. Thereafter, in response to pressing the reading start button 50e, the file displayed in the database display region 50d is read and stored in a predetermined region of the storage unit 30.

In a case in which the analysis target data exists in the database, the user presses the database selection button 50b. In response to pressing the database selection button 50b, a setting screen (not shown) for accessing the database is displayed, and an input of a table name and, as necessary, an input of a password, are prompted to the user. Thereafter, in response to pressing the reading start button 50e, the analysis target data in a predetermined file format is read and stored in a predetermined region of the storage unit 30, and the name of the file including the analysis target data is displayed in the database display region 50d.

In a case in which the analysis target data exists in the Internet or in a server, the user presses the URL designation button 50c. After the URL designation button 50c is pressed, a URL input screen (not shown) is displayed, and an input of a URL is prompted to the user. Thereafter, in response to pressing the reading start button 50e, the analysis target data is downloaded and is read and stored in a predetermined file format in a predetermined region of the storage unit 30, and the name of the file including the analysis target data is displayed in the database display region 50d.

There may be one or plural files that include the analysis target data. FIG. 5 shows a situation of reading analysis target data included in each of two files of a "transaction" file and a "master" file. The file may be read by a method other than these three methods. The format of these files is a CSV format, but other formats may also be used.

FIG. 6 shows the analysis target data included in each of the "master" file and the "transaction" file. In this example, the "master" file includes customer information and records age and gender in association with a customer ID as well as records information whether the customer is alienated, in an "Alienation" column in association with the customer ID. The word "alienation" means stopping visiting a store after visited once. A customer with a record of "1" in the "Alienation" column is an alienated customer, whereas a customer with a record of "0" is not an alienated customer.

The "transaction" file records each purchase history that is corresponded with the "master" file by the "Customer ID" column by each row. The "transaction" file records a purchase date, a category, and a price in association with the customer ID. These data are examples prepared for explanation of the present invention and are not intended to limit the scope of application of the present invention. It is also possible to use the present invention in analyzing various analysis target data other than the purchase history.

Figure 7:
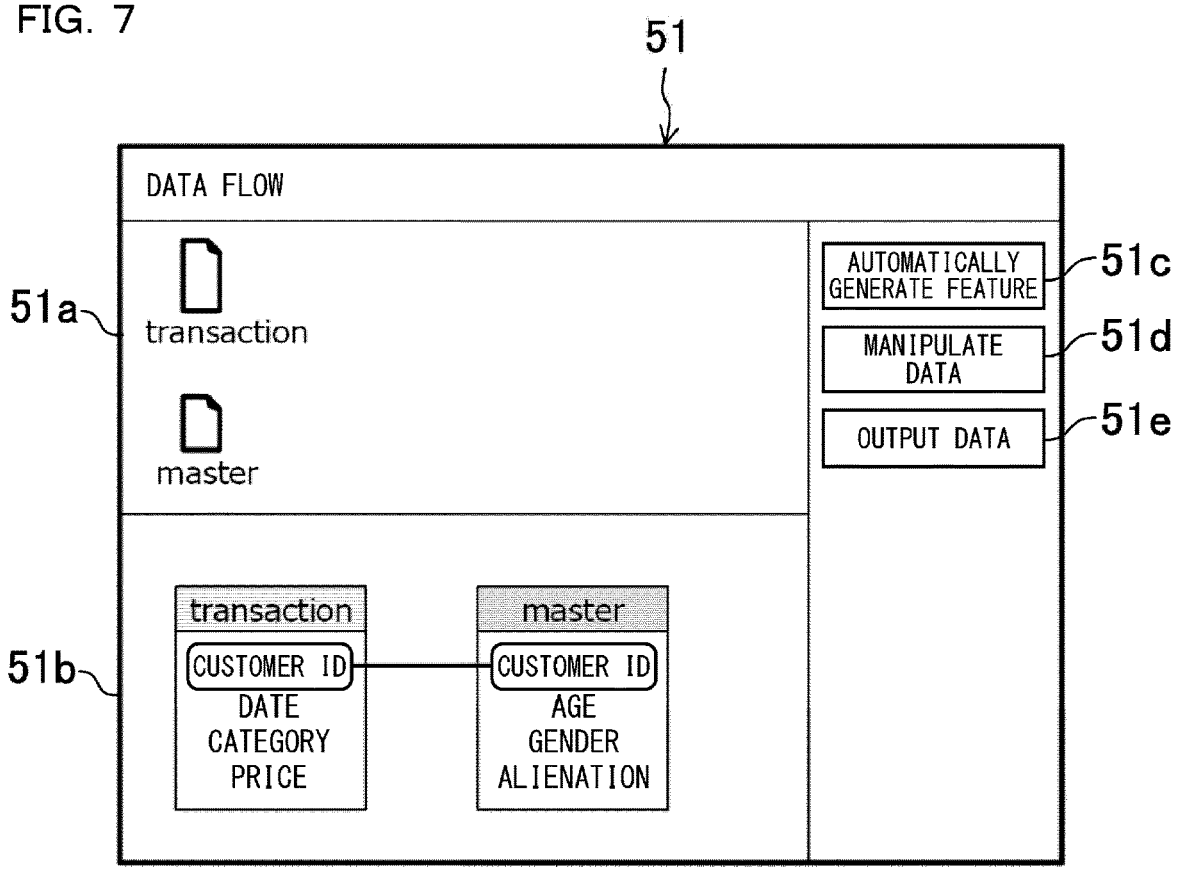
FIG. 7 shows a data flow display user interface.

After the reading of the analysis target data is completed, a data flow display user interface 51 as shown in FIG. 7 is displayed on the monitor 3, and operation of the user on the data flow display user interface 51 is received. The data flow display user interface 51 is provided with a data flow display region 51a, a lower display region 51b, an "Automatically generate feature" button 51c, a "Manipulate data" button 51d, and an "Output data" button 51e.

The data flow display region 51a shows an icon of the read analysis target data. The lower display region 51b shows a relationship diagram between the read analysis target data, which is generally called an "ER diagram". The data input unit 12 shown in FIG. 2 detects whether the read analysis target data have a common column. Whether there is a common column is determined on the basis of the name of the column, for example. In this example, the "master" file and the "transaction" file each have a column with a name "Customer ID" as shown in FIG. 6, and this is detected by the data input unit 12. The data input unit 12 determines that the "customer ID" in the "master" file relates to the "customer ID" in the "transaction" file and displays the "Customer ID" in the "master" file and the "Customer ID" in the "transaction" file by connecting them with a line in the relationship diagram, which is displayed in the lower display region 51b, as shown in FIG. 7.

The above-described process is included in a process for receiving an input of the analysis target data and are performed by the data input unit 12. The data input unit 12 may include an input device such as the keyboard 4 or the mouse 5. The above-described process corresponds to a data input step in step SB1 in the flowchart shown in FIG. 4.

Figure 8:
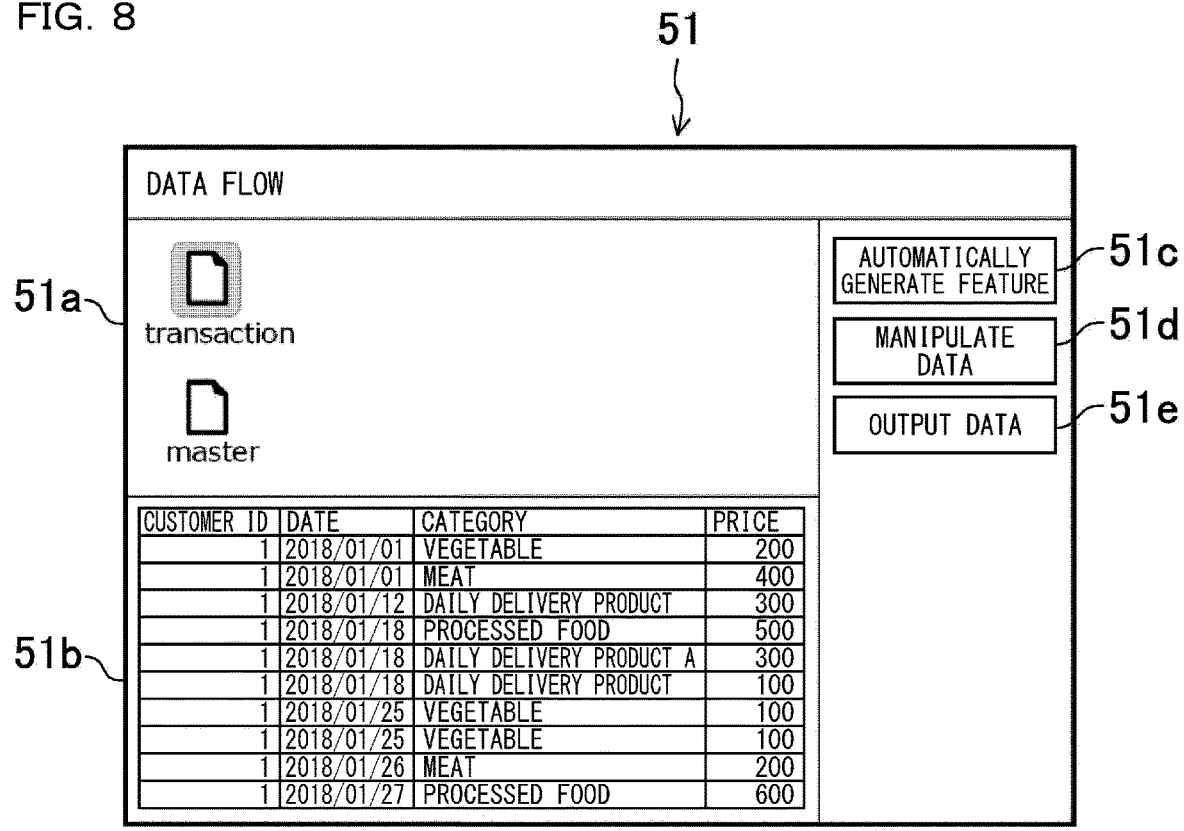
FIG. 8 shows the data flow display user interface showing a preview of analysis target data.

In step SB2 following step SB1, the analysis target data input in the data input step is manipulated. First, data to be manipulated is selected from among the analysis target data displayed in the data flow display region 51a in the data flow display user interface 51 shown in FIG. 7. The selection operation of the data is performed, for example, by clicking the icon corresponding to the data to be manipulated. In response to clicking the icon, the relationship diagram in the lower display region 51b is deleted, and instead, the selected analysis target data is displayed in the lower display region 51b as shown in FIG. 8. At this time, it is possible to display a preview of only a part of the selected analysis target data in the lower display region 51b.

Taking a look at a preview of the "transaction" file, the "Category" column includes both the phrases "daily delivery product" and "daily delivery product A". The prices for the "daily delivery product" and the "daily delivery product A" differ from each other, and therefore, these are treated as categories different from each other in model learning, which is described later. However, if it is desired to treat them as the same category from a point of view of data analysis, these different phrases may be represented by the same phrase in order to obtain a higher accuracy. This process is called "data manipulation".

Figure 9:
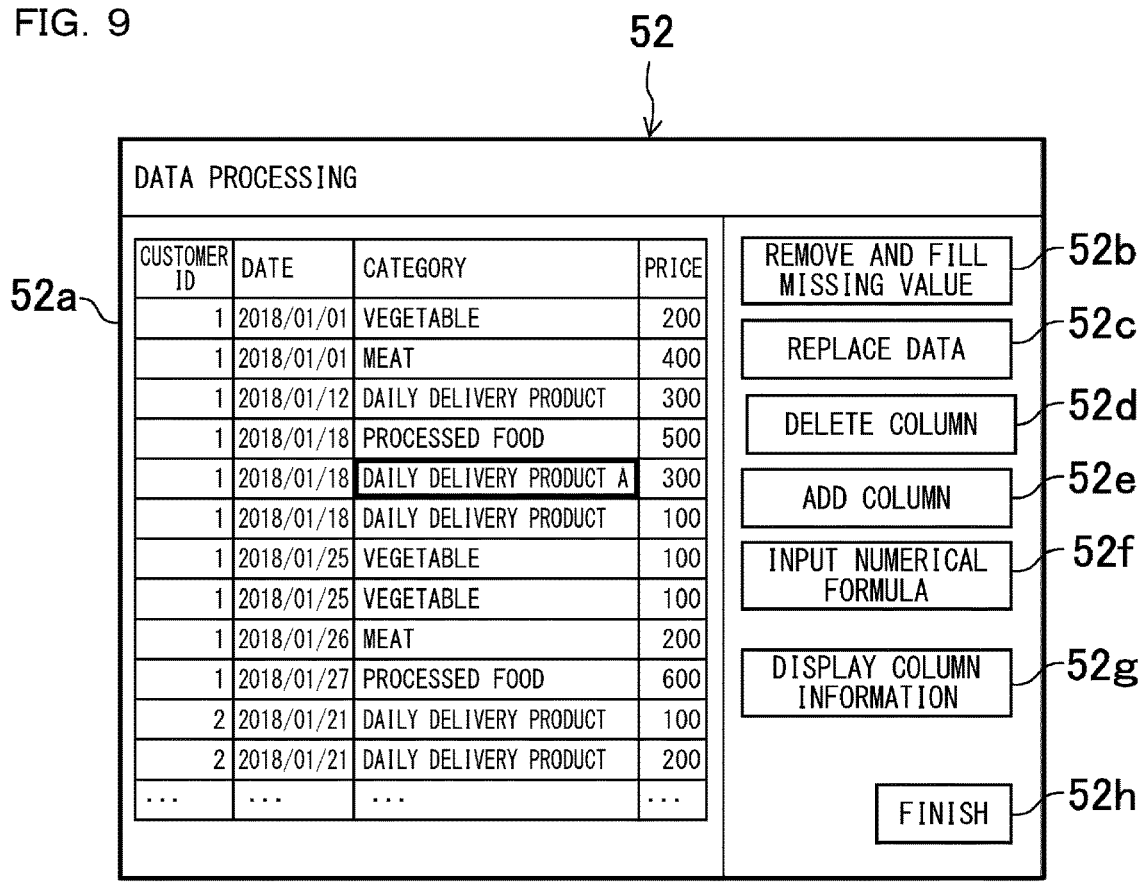
FIG. 9 shows a data manipulation user interface.

In order to perform the data manipulation, the "Manipulate data" button 51d in the data flow display user interface 51 shown in FIG. 8 is pressed. After the "Manipulate data" button 51d is pressed, a data manipulation user interface as shown in FIG. 9 is displayed on the monitor 3, and operation of the user on the data manipulation user interface 52 is received. The data manipulation user interface 52 is provided with a manipulation target data display region 52a, a "Remove and fill missing value" button 52b, a "Replace data" button 52c, a "Delete column" button 52d, an "Add column" button 52e, an "Input numerical formula" button 52f, a "Display column information" button 52g, and a "Finish" button 52h. The manipulation target data display region 52a shows the selected analysis target data in a table format. In a case in which a large table is displayed, the table may be scrolled.

The "Remove and fill missing value" button 52b is operated to remove a missing value in the analysis target data and to fill up the analysis target data. Operating the "Remove and fill missing value" button 52b enables removing any missing value and filling a missing item. The "Replace data" button 52c is operated to replace the existing value with another value. For example, after a "daily delivery product A" cell in the "Category" column is selected, the "Replace data" button 52c is pressed, and a phrase "daily delivery product" is input as a replacement character or replacement value, whereby the value "daily delivery product A" in each cell of the column is automatically replaced with the value "daily delivery product". The "Delete column" button 52d is operated to delete any column. Pressing the "Delete column" button 52d after any column is selected causes deletion of the selected column. The "Add column" button 52e is operated to add any column. Pressing the "Add column" button 52e after any column in the table is selected causes addition of a column in either of before and after the selected column. The "Input numerical formula" button 52f is for inputting a numerical formula in a cell. A numerical formula that is input by operating the "Input numerical formula" button 52f provides a calculated value. The "Display column information" button 52g is for adding specific information in any column.

The "Remove and fill missing value" button 52b, the "Replace data" button 52c, the "Delete column" button 52d, the "Add column" button 52e, the "Input numerical formula" button 52f, or the "Display column information" button 52g is operated to manipulate the analysis target data. Thus, the data analyzing device 1 performs an ETL process. Performing the ETL process enables modifying the analysis target data into data more suitable for analysis. This further increases the accuracy of the analysis result. After the series of operations is finished, the "Finish" button 52h in the data manipulation user interface 52 shown in FIG. 9 is pressed.

Figure 10:
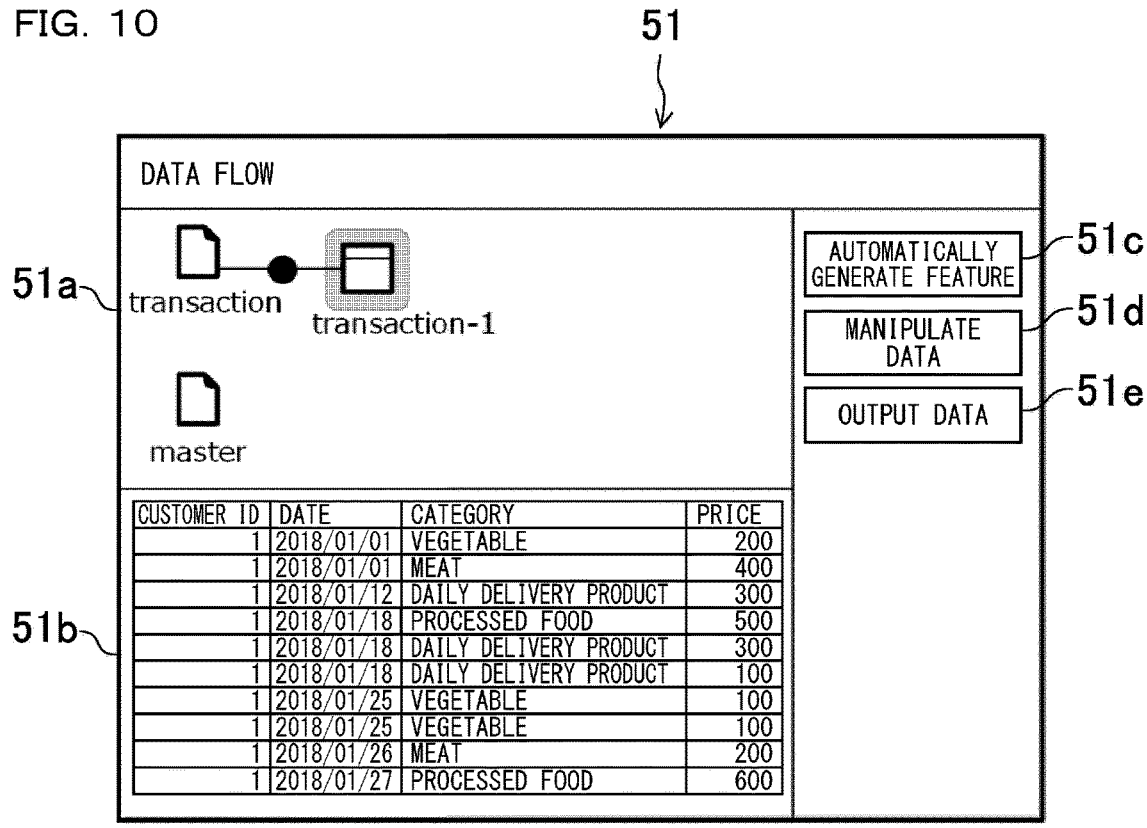
FIG. 10 shows the data flow display user interface showing an icon of manipulated data.

In response to pressing the "Finish" button 52h, the data flow display user interface 51 is displayed again as shown in FIG. 10. The data flow display region 51a of the data flow display user interface 51A shows a new icon for a "transaction-1" file. The "transaction-1" file is analysis target data of the manipulated "transaction" file. The icon of the "transaction-1" file and the icon of the "transaction" file are connected with an association line, whereby the relationship between the "transaction-1" file and the "transaction" file are graphically displayed. Thus, the user intuitively understands that the "transaction-1" file is manipulated data of the "transaction" file and that the "transaction-1" file is subjected to the manipulation. The series of the operations of the ETL process is a data manipulation process in step SB2 in the flowchart shown in FIG. 4.

Figure 4:
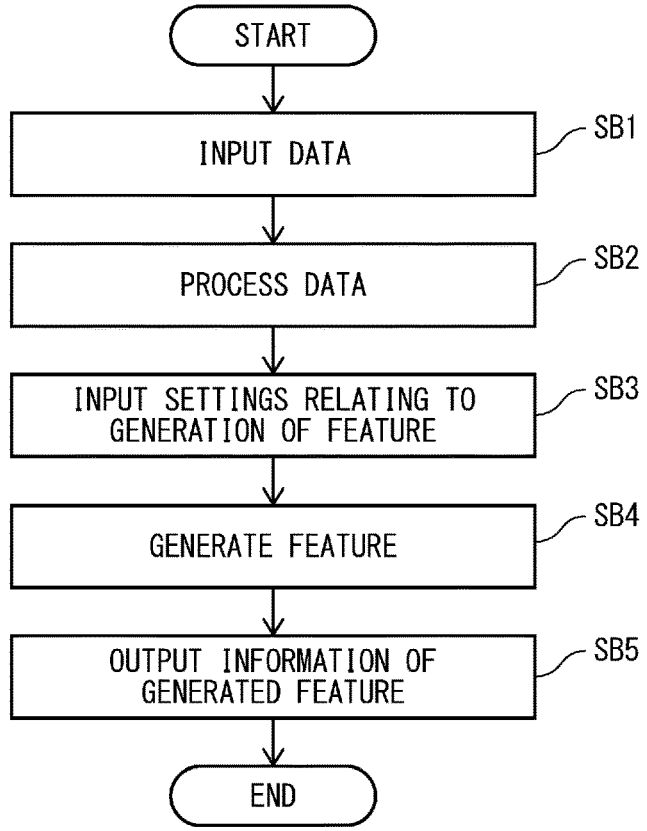
FIG. 4 is a flowchart showing operation of the data analyzing device.

After the series of the operations of the ETL process is finished, the processing advances to a step for inputting settings relating to generation of a feature, in step SB3 in the flowchart shown in FIG. 4. In response to pressing the "Automatically generate feature" button 51c in the data flow display user interface 51 shown in FIG. 10, a feature automatically generation user interface 53 as shown in FIG. 11 is displayed on the monitor 3, and operation of the user on the feature automatically generation user interface 53 is received.

The feature automatically generation user interface 53 is provided with a data flow display region 53a, a lower display region 53b, a relationship designation region 53c, an objective variable designation region 53d, a detail setting region 53e, and an "Execute" button 53f. The data flow display region 53a shows a data flow as in the case of the data flow display region 51a in the data flow display user interface 51 shown in FIG. 10, for example. The lower display region 53b shows a relationship diagram between the analysis target data as in the case of the lower display region 51b in the data flow display user interface 51 shown in FIG. 7.

Figure 11:
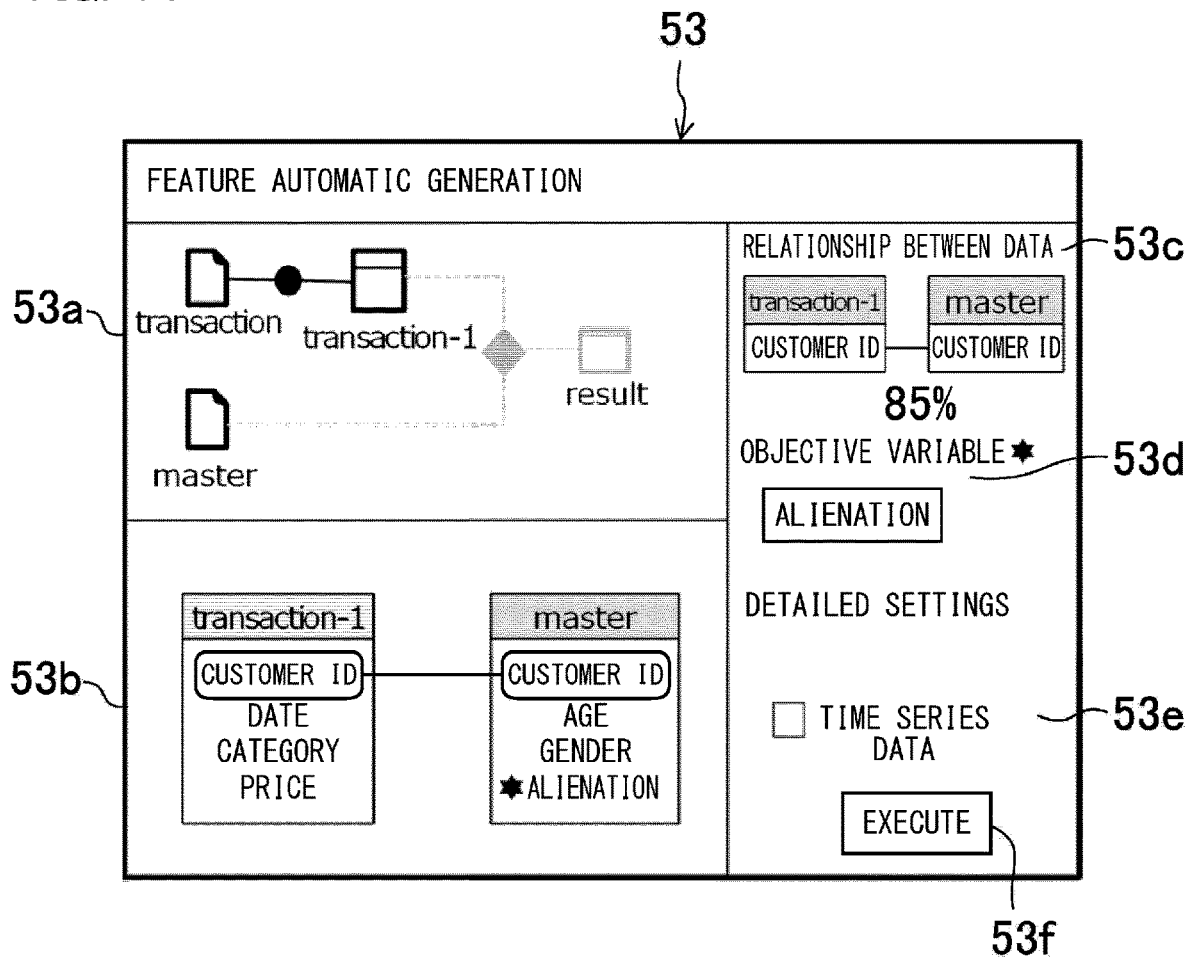
FIG. 11 shows a feature automatically generation user interface.

The relationship designation region 53c shown in FIG. 11 is used for designating a correspondence relationship between the plurality of analysis target data. Herein, a correspondence relationship between the "transaction-1" file and the "master" file is designated. In one example, the "customer ID" in the "transaction-1" file and the "customer ID" in the "master" file correspond to each other as described above, and therefore, the "customer ID" in the "transaction-1" file and the "customer ID" in the "master" file are designated due to having a correspondence relationship. However, designation is not limited to this example, and any column in the "transaction-1" file and any column in the "master" file can also be designated due to having a correspondence relationship, and matching of the names of these columns is not necessary.

Designation of the relationship may be performed by selecting from a list of features, by drawing a line by dragging operation on the relationship diagram, or by directly inputting the name. If there is only one data, the correspondence relationship between the analysis target data is not designated.

Figure 12:
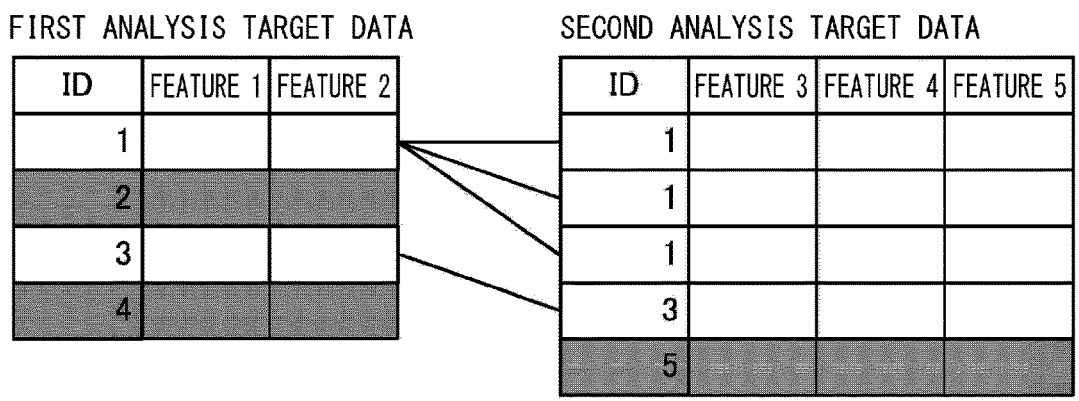
FIG. 12 is a diagram for explaining a method of calculating a ratio of corresponding pieces of data between two analysis target data.

The relationship designation region 53c includes a percentage at a lower part. This value shows the ratio of corresponding rows between the two analysis target data to the total rows in a designated column. For example, as shown in the example in FIG. 12, an "ID" column in first analysis target data includes numbers "1" for one row, "2" for one row, "3" for one row, and "4" for one row, whereas an "ID" column in second analysis target data includes numbers "1" for three rows, "3" for one row, and "5" for one row. The ID number "1" in the first analysis target data corresponds to the ID number "1" of the three rows in the second analysis target data, the ID number "3" in the first analysis target data corresponds to the ID number "3" of the one row in the second analysis target data, and the other ID numbers do not correspond to each other. In this case, the first analysis target data corresponds to the second analysis target data at the "ID" column by 50% or two-fourth of the rows, and, conversely, the second analysis target data corresponds to the first analysis target data at the "ID" column by 80% or four-fifth of the rows, and the first analysis target data and the second analysis target data correspond to each other by six-ninth of the rows, that is, approximately 67%, in total. Such calculation is performed, and the calculation result is displayed in the lower part of the relationship designation region 53c.

The objective variable designation region 53d is used for designating an objective variable to be analyzed. Designation of the objective variable causes determination of an aggregated table. In this case, in order to analyze whether a customer will be alienated, the "Alienation" column in the "master" file is designated as the objective variable. Thus, features in the "transaction-1" file are aggregated, and the aggregated value is added to the "master" file as a new feature. Designation of the objective variable may be performed by selecting from the list of the features, by dragging operation in the list, or by directly inputting the name. In response to designating the objective variable, the data analyzing device 1 sets a flag in the designated feature to show that this feature is designated as a target variable. The set flag prevents generation of a feature from the objective variable itself. The feature is described later.

The series of these operations is a process for inputting settings relating to generation of a feature in step SB3 in the flowchart shown in FIG. 4.

In the subsequent step SB4, a process for generating a feature is executed. This process is started by pressing the "Execute" button 53f in the feature automatically generation user interface 53.

Figure 13:
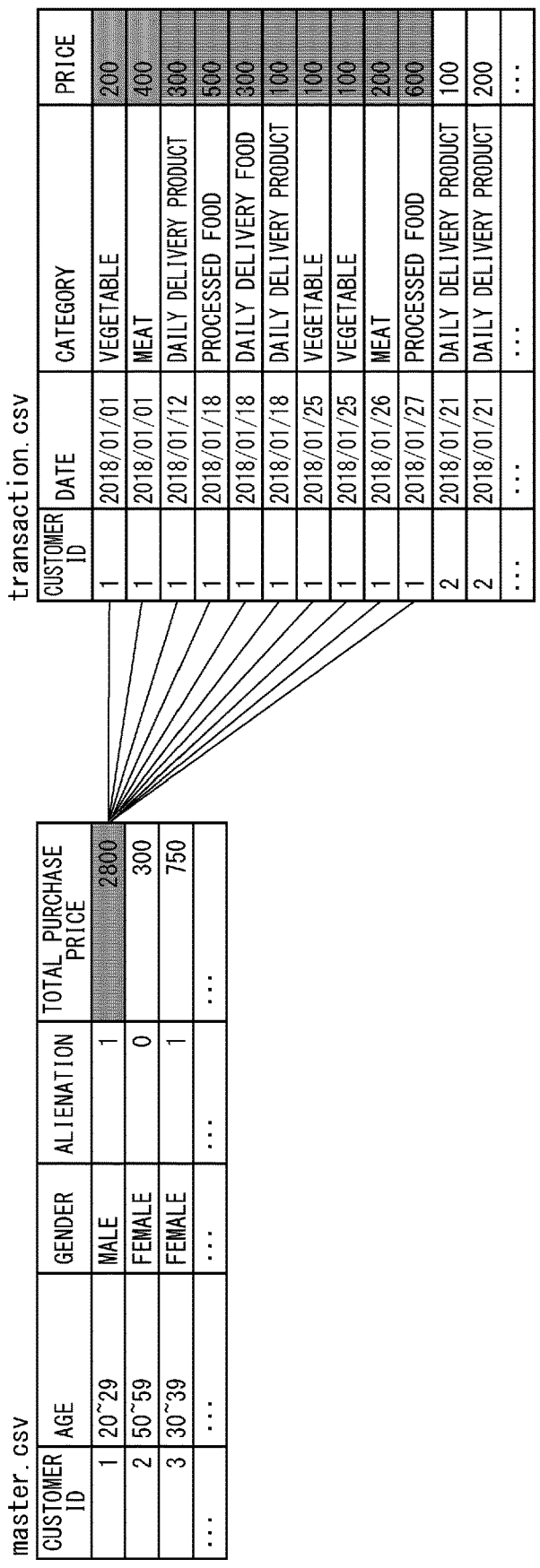
FIG. 13 is a diagram for explaining a case of adding a sum of values in a "Price" column to a "master" file.

That is, in the case in which a plurality of analysis target data are designated in steps SB1 and SB2, and a relationship of the plurality of analysis target data is designated in step SB3, a method for generating a feature may use, for example, a technique as described in AJ Knobbe, "Propositionalisation and Aggregates", (2001). FIG. 13 shows an example of a case of summing up values in a "Price" column in the "transaction" file and adding the resultant sum in the "master" file as a value of a feature. The purchase history for the number "1" in the "Customer ID" column in the "transaction" file is extracted, and values in the "Price" column are summed up, and a total purchase price is obtained. A "Total purchase price" column is generated in the "master" file, and the sum is automatically input in the "Total purchase price" column for the number "1" in the "Customer ID" column. This is achieved because the rows of the "master" file and the "transaction" file are corresponded to each other by the "Customer ID" column.

Figure 14:
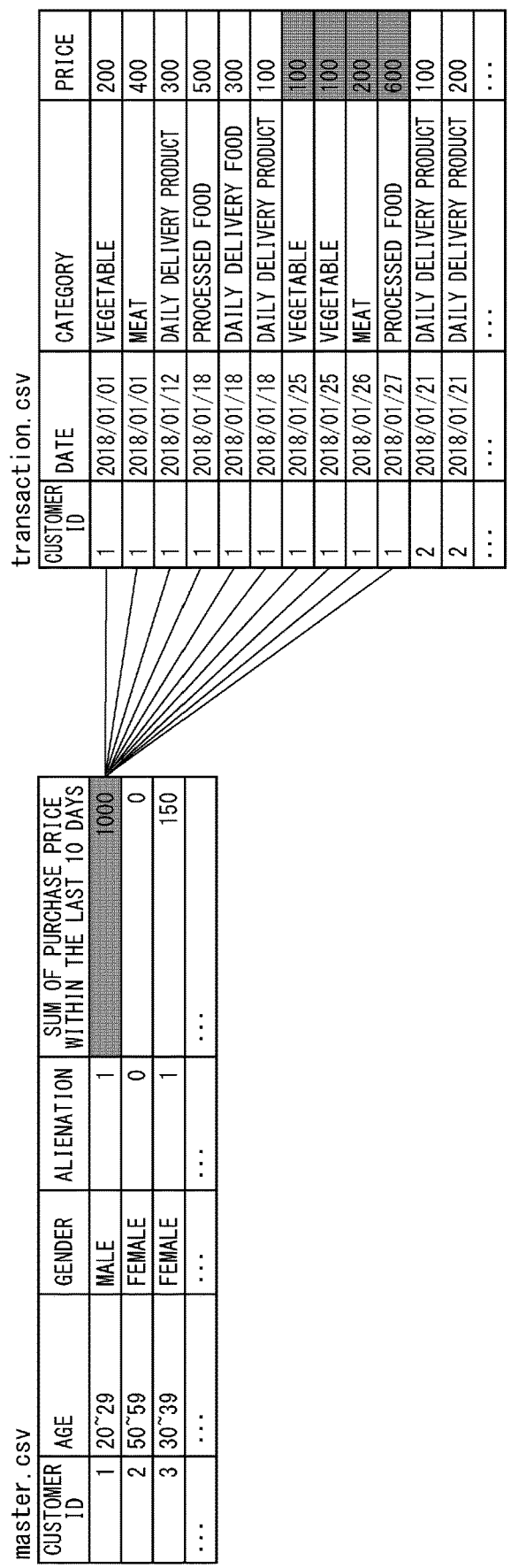
FIG. 14 is a diagram for explaining a case of determining rows to be aggregated on the basis of a combination with a row showing date.

The rows to be aggregated may be determined on the basis of, for example, a combination with a row showing a date. In one example, as shown in FIG. 14, the purchase history for the number "1" in the "Customer ID" column in the "transaction" file is extracted, and values in the "Price" column within the last 10 days before Feb. 1, 2018, are summed up. A "Sum of purchase price within the last 10 days" column is generated in the "master" file, and the sum in the "Price" column within the last 10 days is automatically input in the "Sum of purchase price within the last 10 days" column for the number "1" in the "Customer ID" column. A similar process may also be performed for every customer ID.

In the case in which the analysis target data is time series data, the accumulation period can be changed such that, for example, an accumulation period of 10 days, 20 days, or 30 days. Changing the accumulation period enables generating various kinds of features although the same aggregate function is used. The unit of the period may be any of second, minute, hour, month, and year. For example, the total accumulation period of the analysis target data may be obtained, and the obtained total accumulation period may be automatically divided into a plurality of accumulation periods. Assuming that the total accumulation period of the analysis target data is 30 days, the total accumulation period may be divided into accumulation periods from 0 to 10th day, from 11th to 20th day, and from 21st to 30th day. The division of the accumulation period may be performed by a derived diagram generating unit 16b at the time the derived diagram generating unit 16b generates a derived diagram. The derived diagram generating unit 16b is described later.

After the feature is generated, a degree of importance of each feature on prediction of the objective variable is evaluated. The prediction of the objective variable is executed by the prediction model generating unit 13 shown in FIG. 2. This process is a prediction model generating step. The prediction model generating unit 13 generates a prediction model for predicting the objective variable from a plurality of features. The prediction model is generated, for example, by multiple regression analysis or by a decision tree. There are various generation techniques for the prediction model, and a conventionally known method can be used in each of these generation techniques.

After the prediction model is generated, the degree of importance of each of the plurality of features on prediction using the prediction model is calculated. This process is executed by the importance degree calculating unit 14 shown in FIG. 2 and is an importance degree calculating step. The degree of importance of the feature is known by the name "Feature Importance". Various calculation methods for the degree of importance are developed, and any calculation method can be used. For example, in a case of using a linear multiple regression model that is represented by the following formula (1), a coefficient a1, a2, ..., for each feature x1, x2, ..., may be calculated, and an absolute value of the result may be used as a value of the degree of importance.

$$y = a1x1 + a2x2 + \ldots + anxn \quad (1)$$

Alternatively, instead of directly using the coefficients, the coefficients may be corrected so that the magnitudes of the features x1, x2, ..., will coincide with each other, thereby obtaining normalization coefficients, and the normalization coefficients may be used as the degrees of importance.

The degree of importance is thus analyzed, and thereafter, a higher degree of importance is extracted by the control unit 10. At this time, in the above-described case of having the features of the different accumulation periods, only the highest degree of importance is left, and the others are deleted even when a plurality of features have higher degrees of importance. The reason for this is that, for example, when a feature "Sum of purchase price within the last 30 days", a feature "Sum of purchase price within the last 20 days", and a feature "Sum of purchase price within the last 10 days" are highly ranked at the same time, if all of these features are presented to the user, the features having approximately the same meaning are displayed, which makes it difficult for the user to understand. In addition, if features having the same meaning are highly ranked, other useful features are removed from high ranks, resulting in difficulty in acquiring a useful knowledge.

The number of the features highly ranked may be, for example, 2 or greater, 5 or greater, 10 or greater, or 20 or greater. The number of the features highly ranked may be automatically set by the control unit 10 or may be freely set by the user.

The series of these operations is included in the process for generating a feature in step SB4 in the flowchart shown in FIG. 4. Upon completion of the generation of the feature, the processing advances to step SB5. In Step SB5, information of the feature generated in step SB4 is output.

Figure 15:
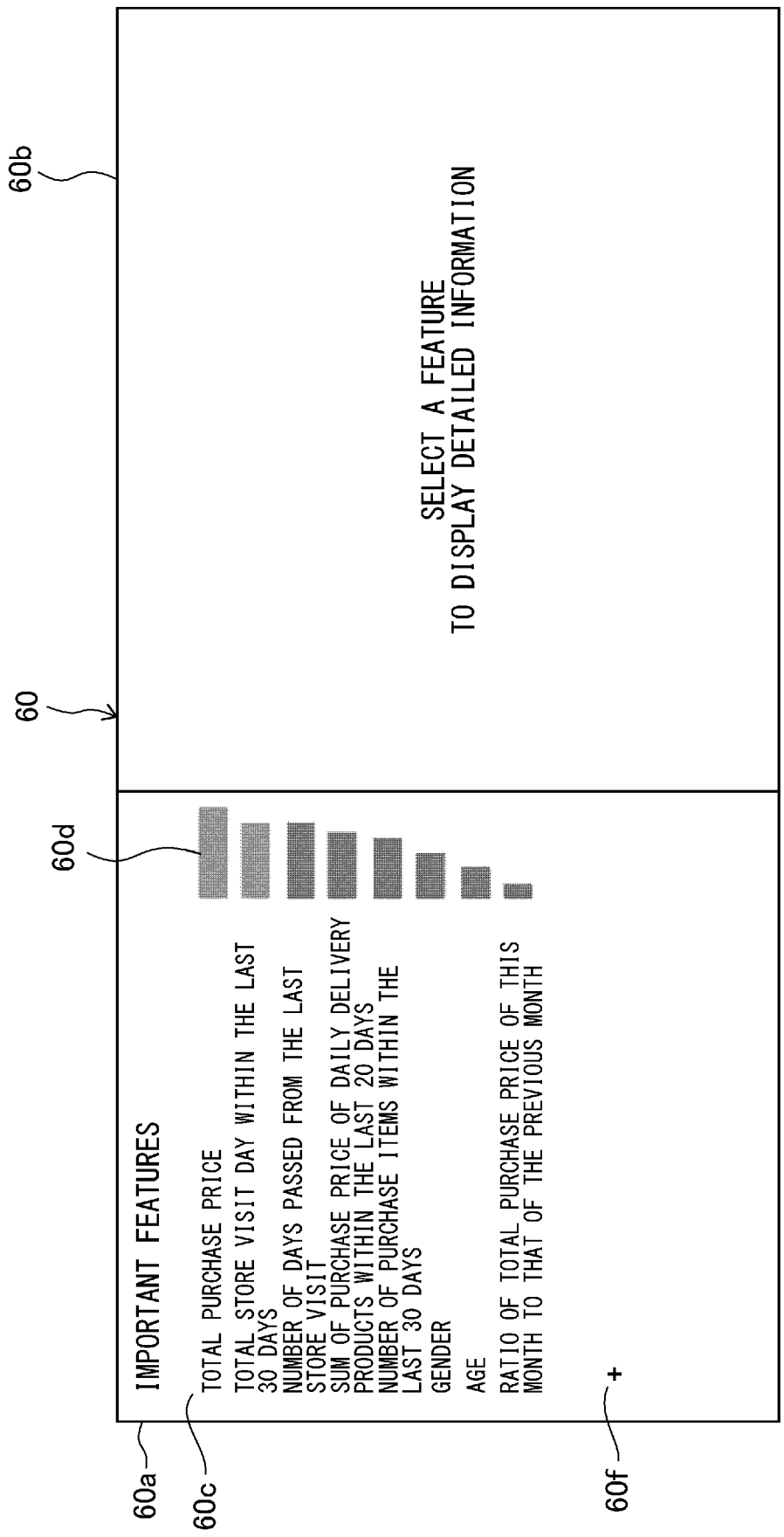
FIG. 15 shows a feature display user interface.

After generation of the feature is completed, and features highly ranked are extracted, a feature display user interface 60 as shown in FIG. 15 is displayed on the monitor 3, and operation of the user on the feature display user interface 60 is received.

The feature display user interface 60 is provided with a feature display region 60a and a detailed information display region 60b. The feature display region 60a and the detailed information display region 60b may be arranged left and right on the monitor 3. The feature display region 60a shows the features highly ranked. That is, the monitor 3 displays features having higher degrees of importance on the basis of the degrees of importance calculated by the importance degree calculating unit 14. This step is a feature displaying step.

The monitor 3 displays a plurality of features having higher degrees of importance in the order of higher degree of importance, that is, displays ranking of the plurality of features. In this example, a feature having the highest degree of importance and a plurality of features having degrees of importance less than the highest degree of importance are displayed at the same time. The feature having the highest degree of importance is displayed at the highest position, and the others are arranged in descending order of the degree of importance. The features may be arranged in ascending order or in a left and right direction. The number of the features to be displayed in the feature display region 60a may be any appropriate number and is not particularly limited.

The feature display region 60a is provided with a name display part 60c for displaying the name of the feature and an importance degree display part 60d for displaying the degree of importance. The name display part 60c displays the name of the feature included in each of the "transaction" file and the "master" file. The name of the feature included in each of the "transaction" file and the "master" file may be shown at the name display part 60c as it is, but it can be changed by the user.

The importance degree display part 60d displays the degree of importance on a side of a corresponding feature in a bar graph form. In the case of displaying the degree of importance in a bar graph form, a longer bar may represent a higher degree of importance. The importance degree display part 60d may display the degree of importance by value instead of each type of graph form or may display values and a graph at the same time.

The feature display region 60a is provided with a feature adding button 60f. Upon pressing the feature adding button 60f, features except for those displayed in the feature display region 60a are displayed to enable the user to select a feature to be displayed in the feature display region 60a therefrom. The selected feature is displayed in the feature display region 60a. In addition, operations such as deleting or hiding a feature that is supposed to be unnecessary among the features displayed in the feature display region 60a can also be performed.

Detail of Operation of Control Unit 10

Figure 16:
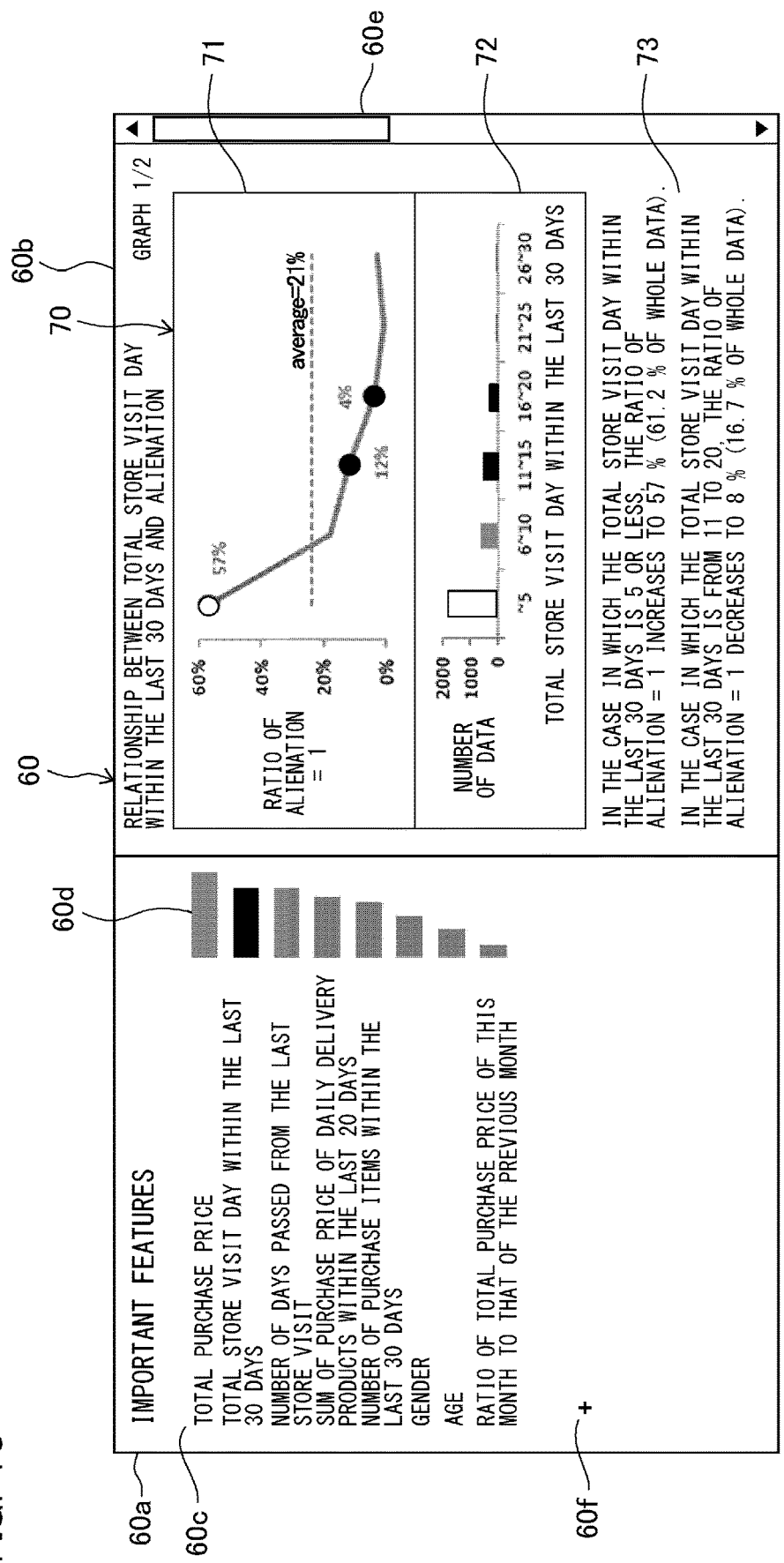
FIG. 16 shows the feature display user interface in a case of selecting a "Total store visit day within the last 30 days"

The features that are displayed in the feature display region 60a of the feature display user interface 60 shown in FIG. 15 are able to be selected by the user. After the user inputs selection of a feature by using a device such as the mouse 5, as shown in FIG. 16, the detailed information display region 60b of the feature display user interface 60 displays a first basic diagram 70. The first basic diagram 70 is generated by a basic diagram generating part 16a of the display diagram generating unit 16 shown in FIG. 2. This process is a basic diagram generating step. That is, the basic diagram generating part 16a generates a basic diagram that shows a relationship between a first feature and the objective variable. The first feature is a feature selected in accordance with an input of the user, from among the features displayed in the monitor 3. The first feature is selected by the user. In the example shown in FIG. 16, the first feature is the feature "Total store visit day within the last 30 days". The feature that is selected by the user is highlighted to enable easy identification among the features. The first basic diagram 70 shows a relationship between each of a plurality of clusters and a representative value of the objective variable of the corresponding cluster. The plurality of clusters are obtained by dividing the analysis target data on the basis of the values of the feature selected in accordance with an input of the user.

The following describes details of the first basic diagram 70. The first basic diagram 70 is divided into three areas of an upper area 71, a middle area 72, and a lower area 73. The upper area 71 displays a line graph showing a ratio of alienation on the vertical axis and the total store visit day within the last 30 days on the lateral axis. The ratio of alienation is a ratio of customers who stop visiting the store after visited once. The lateral axis shows the total store visit day within the last 30 days by dividing it into six periods or six intervals. The line graph shows a relationship between the selected feature and the objective variable, in this case, the alienation.

The middle area 72 displays a bar graph showing the number of data on the vertical axis and the total store visit day within the last 30 days on the lateral axis. The lateral axis of the bar graph is shared with the lateral axis of the line graph displayed in the upper area 71. The bar graph represents the number of data in each interval and serves as a frequency table. That is, the control unit 10 divides the analysis target data into a plurality of periods on the basis of the values of the first feature to form clusters and generates a data number display graph that shows the number of pieces of data in the analysis target data belonging to each cluster. The monitor 3 is able to display the generated data number display graph.

The line graph in the upper area 71 and the bar graph in the middle area 72 show tendencies. In one example, "as the total store visit day within the last 30 days increases, the ratio of data of "alienation=1" tends to decrease". In another example, "in the case in which the total store visit day is from 21 to 25 days, the ratio of data of "alienation=1" is smallest, but the number of data is small".

The control unit 10 also calculates an average of the ratios of the data of "alienation=1". This average can be used as an average of the whole data. In this example, the average is 21%. Moreover, in the interval that is determined as having a significant difference in the average of the objective variable, compared with the average of the whole data, which is 21% in this case, the series of the interval is highlighted, and an explanatory note is added to a lower part of the graph, that is, in the lower area 73.

In the case in which there is no significant difference, the highlighting is not performed. It is determined that "there is no significant difference" when the representative value of the interval is expected not to have a sufficient difference from the representative value of a compared interval in consideration of factors such as variations in data, and the number of data. The highlighting enables differentiating a character from other characters. The highlighting includes, for example, thickening a character, changing the color of a character into color different from those of other characters, and adding color to the background of a character.

The explanatory note describes a relationship between the selected first feature and the objective variable and is automatically generated by the explanatory note automatically generating unit 18 shown in FIG. 2. The explanatory note automatically generating unit 18 generates an explanatory note on the basis of, for example, the name of the analysis target data received by the data input unit 12, the name of the feature, the relative difference of the feature, and the number of data. The explanatory note describes information such as a degree of influence of the selected first feature on the objective variable. This makes it easier for the user to understand the relationship between the feature and the objective variable as well as saves time and labor for generating a comment by the user.

The determination of the significant difference is described below. The determination of the significant difference can use an index that is generally used in statistics, such as a p-value or a t-test. For example, the t-test is calculated by the following formula 1. The symbols "x" and "s" respectively represent an average and a standard deviation of an objective value of a target series, the symbol "μ" is a total average of the objective values, and the symbol "n" represents the number of data of the target series. As the result is greater, it is more reliably determined that the difference is significant.

$$t = \frac{\bar{x} - \mu}{s\sqrt{\frac{1}{n}}} \quad \text{Formula 1}$$

Using such an index enables taking the volume of data and variations in each data into account as well as simply examining a degree of deviation from the total average. Thus, a large deviation that is generated accidentally is differentiated from a truly significant difference.

Highlighting based on the statistical test allows the user to look at the position at which truly meaningful data is shown, among displayed data, thereby making it possible to quickly acquire a useful knowledge from the automatically generated features.

Figure 17:
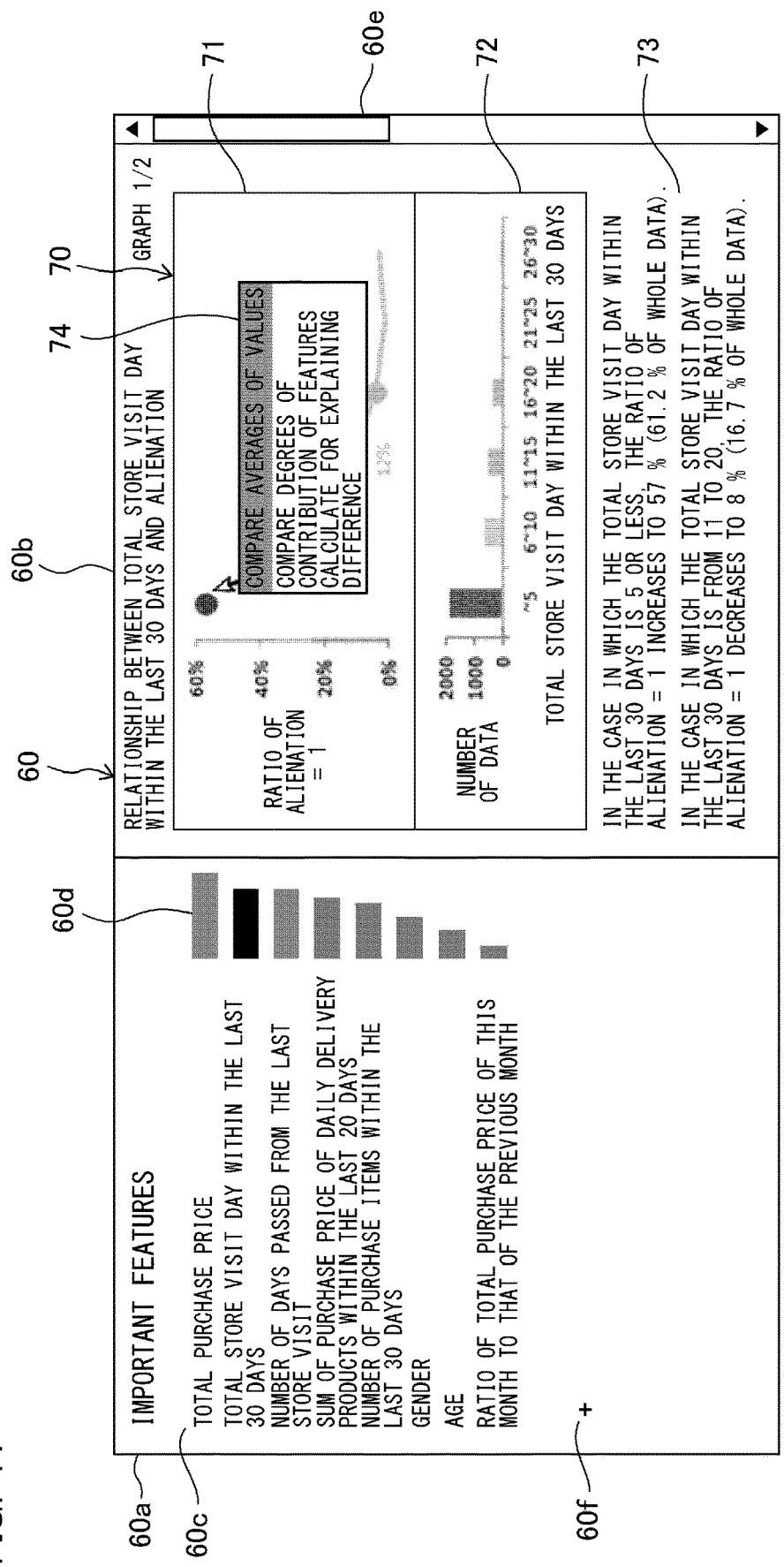
FIG. 17 shows the feature display user interface in a case of selecting a menu item "Compare averages of values" in a detailed menu.

When any interval is selected in the graph displayed in the upper area 71, a detailed menu 74 is displayed as shown in FIG. 17. The detailed menu 74 is for comparing data included in the selected interval with the tendency shown by the whole data and enables displaying further detailed information in response to selection of a menu item. The detailed menu 74 includes three menu items "Compare averages of values", "Compare degrees of contribution of features", and "Calculate for explaining difference".

Figure 18:
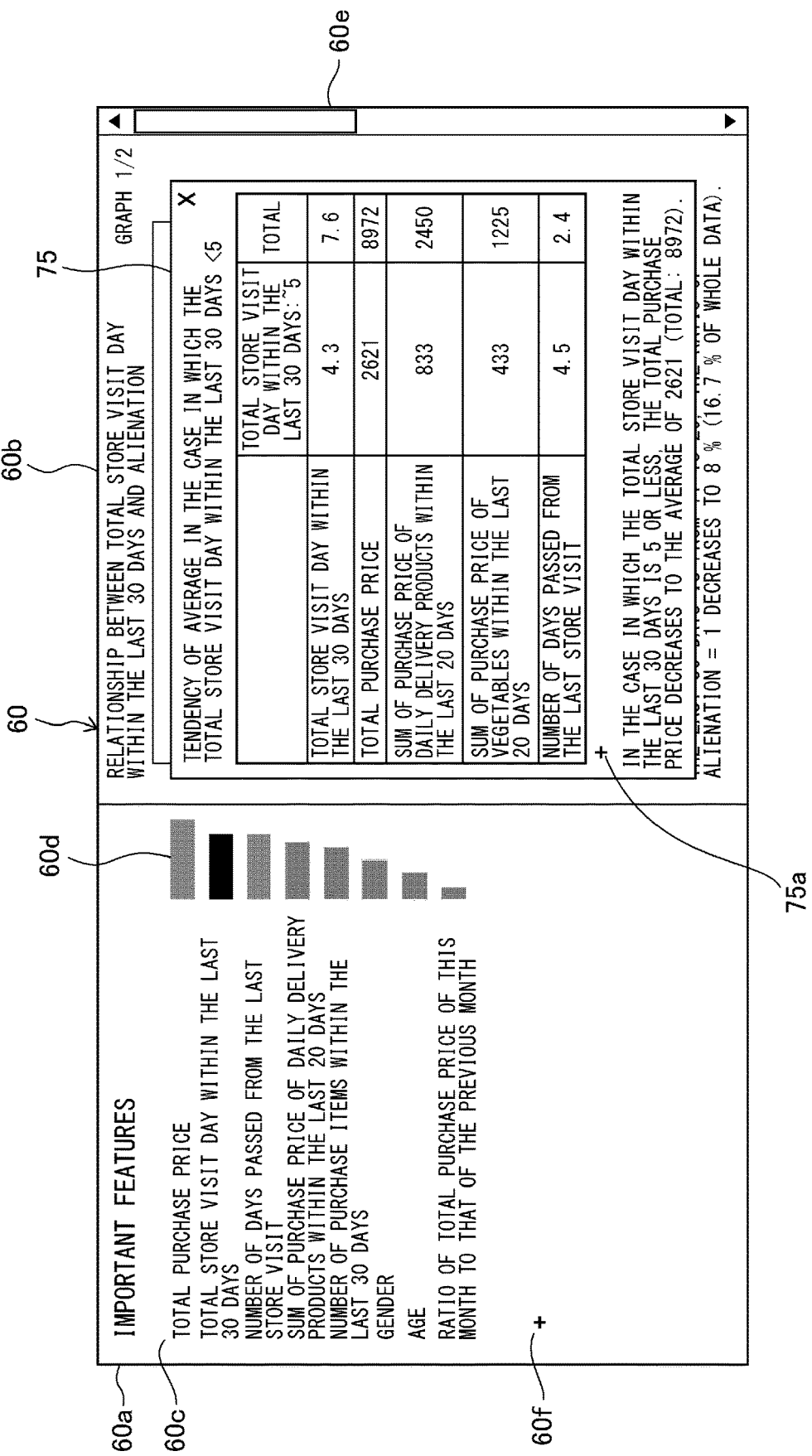
FIG. 18 shows the feature display user interface showing a comparison table.

As shown in FIG. 17, for example, the menu item "Compare averages of values" may be selected in the interval in which "Total store visit day within the last 30 days" is from 0 to 5 days. Then, as shown in FIG. 18, a comparison table 75 showing comparison of average of the feature between the data of the selected interval and the whole data is displayed.

In more detail, when the user selects any one of the plurality of clusters shown in the first basic diagram 70 in FIG. 16 by clicking or another operation, this operation is received by the cluster selecting unit 15 shown in FIG. 2. This process is a cluster selecting step. The comparison diagram generating unit 16c shown in FIG. 2 generates the comparison table 75 as shown in FIG. 18 after the cluster selecting unit 15 receives the selection. The comparison table 75 shows a comparison of the feature that contributes prediction of the objective variable, between the selected cluster and the whole cluster or a cluster not selected by the cluster selecting unit 15. This process is a comparison diagram generating step.

Although details are described later, the comparison diagram generating unit 16c may also generate a comparison diagram that shows features having significantly high degrees of contribution only in the cluster selected by the cluster selecting unit 15. Moreover, the comparison diagram generating unit 16c may also generate a comparison diagram that shows features not selected by the user among the features having higher degrees of importance. Furthermore, the comparison diagram generating unit 16c may also generate a comparison diagram that shows features contributing prediction of the objective variable in a cluster with no value of the analysis target data.

The comparison table 75 is a comparison diagram in the form of table, but it may be a comparison diagram showing a graph instead of the table. The monitor 3 displays the first basic diagram 70 and the comparison table 75 at the same time or at different times and executes a comparison diagram displaying step for displaying the first basic diagram 70 and the comparison table 75 at the same time or at different times.

The comparison table 75 shows only features having significantly great difference from averages among all features, including those having lower degrees of importance. The determination of this significance can be performed by using a p-value or a t-test as in the case described above.

It is also possible that the user selects the features to be displayed in the comparison table 75. The comparison table 75 has a feature adding button 75a provided at a lower part. Upon pressing the feature adding button 75a, any feature is added as a comparison axis. It is also possible that the user deletes the feature displayed in the comparison table 75.

In this example, averages are shown in the comparison table 75, but statistics other than the averages, such as variances, medians, or minimum values, may also be shown.

When an interesting data group, which is a customer group with high alienation rates in this example, is found from a point of view of a certain feature, the comparison table 75 enables further detailed investigation for a characteristic that is specific to the data group, thereby making it possible to acquire a new knowledge.

The feature to be an axis of the comparison or the analysis is automatically generated. Thus, a deep knowledge that is hard to be noticed by a user except for an experienced analyst is easily obtained. For example, customers whose total store visit day within the last 30 days are small, purchase vegetables and daily delivery products at particularly small purchase amounts.

Figure 19:
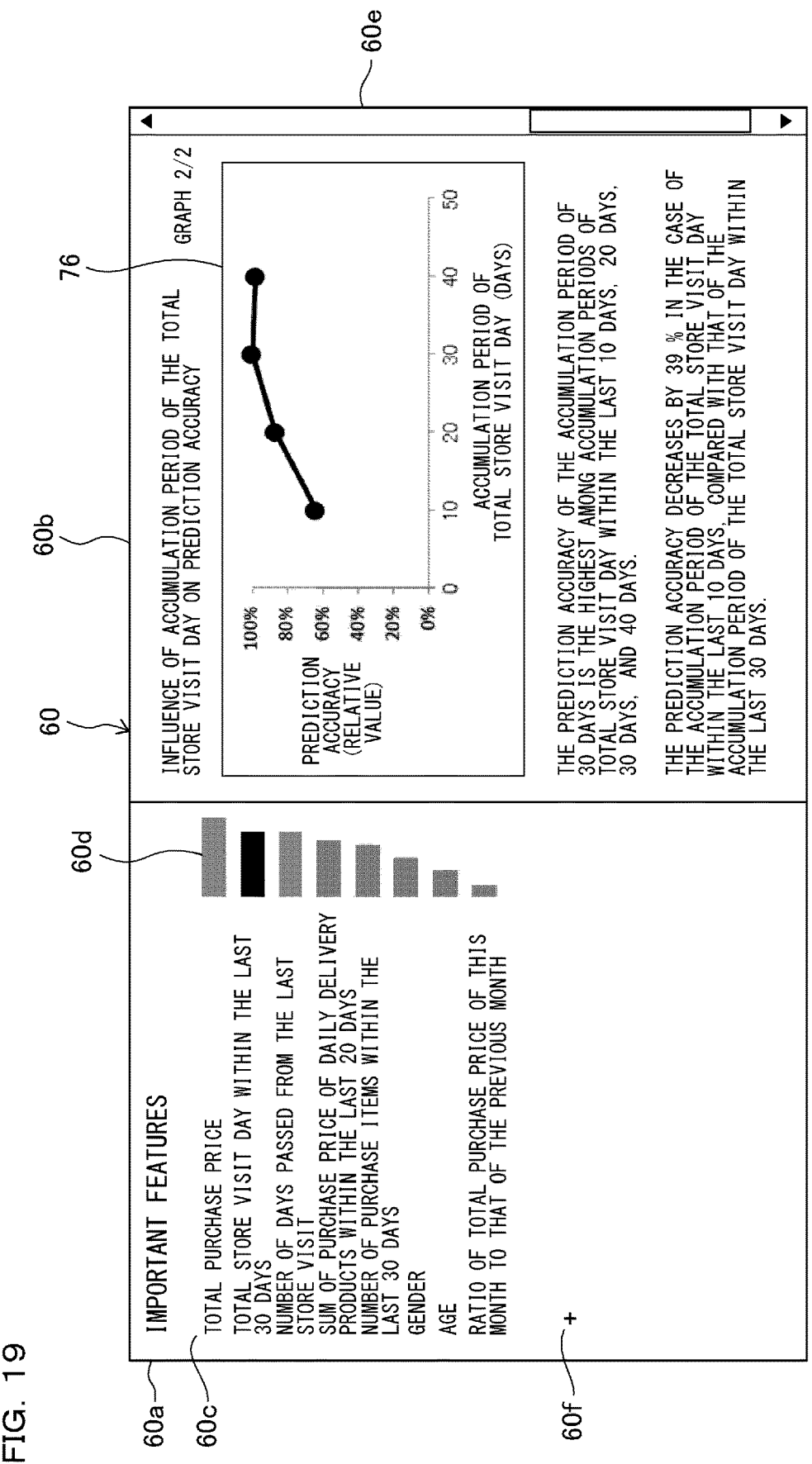
FIG. 19 shows the feature display user interface showing a prediction accuracy comparison graph.

The graph that is displayed in response to selection of the feature may be one or plural. That is, in addition to the graph showing the relationship relative to the objective variable, one or plural graphs showing other information may be displayed. For example, in the case of designating the "Total store visit day within the last 30 days", as shown in FIG. 19, a prediction accuracy comparison graph 76 may be displayed as a second graph. This prediction accuracy comparison graph 76 relates to "comparison of accuracy relative to a case of accumulating data in a period other than days". The prediction accuracy comparison graph 76 is positioned lower than the first basic diagram 70 shown in FIG. 18 and is able to be viewed by controlling a vertical scroll bar 60e to scroll down the screen in the state of displaying the first basic diagram 70 in the detailed information display region 60b. The first basic diagram 70 and the prediction accuracy comparison graph 76 may be displayed at the same time. Thus, a derived diagram displaying step for displaying the first basic diagram 70 and the prediction accuracy comparison graph 76 at the same time or at different times is executed.

The prediction accuracy comparison graph 76 shown in FIG. 19 may also be called a "third derived diagram". The third derived diagram shows a comparison of accuracy between a prediction model generated based on the first feature and a prediction model generated based on another feature that belongs to the same category as the first feature and of which the accumulation period is different from that of the first feature. In this example, the first feature is the feature "Total store visit day within the last 30 days". The differences of the accumulation periods are shown by the lateral axis of the prediction accuracy comparison graph 76, and specifically, the differences of the accumulation periods are represented by the displayed characters of "10 days", "20 days", . . . . The third derived diagram is generated by the derived diagram generating unit 16b shown in FIG. 2. This process is a derived diagram generating step. These features of "Total store visit day within the last 10 days", "Total store visit day within the last 20 days", and "Total store visit day within the last 30 days" belong to the same category called "Total store visit day".

In the case in which the derived diagram generating unit 16b generates the third derived diagram, it is possible to compare the accuracy of the prediction model predicted based on another feature with the accuracy of the prediction model generated based on the first feature. The another feature belongs to the same category as the first feature and has an accumulation period different from that of the first feature. Thus, the user understands the relative difference in the accuracy between the prediction models, thereby easily determining which prediction model should be used to increase the accuracy.

The derived diagram generating unit 16b also generates, at the time of generating the third derived diagram, a diagram illustrates accuracies of prediction models respectively generated based on a plurality of other features and the accuracy of the prediction model generated based on the first feature, in a comparable manner. Moreover, the derived diagram generating unit 16b generates, at the time of generating the third derived diagram, a diagram that enables comparing an accuracy of a prediction model generated based on another feature having a degree of importance equal to or greater than a predetermined value with the accuracy of the prediction model generated based on the first feature. Specifically, a graph may be generated, but a diagram that enables comparison using values may also be generated in other cases.

For example, regarding features of which values are accumulated by unit of time or day, as described above, a plurality of patterns of features having different accumulation periods are generated, and the most suitable pattern is automatically selected therefrom. FIG. 19 shows differences in accuracies of unselected accumulation periods by relative values, thereby implying a "situation when the total store visit day in another accumulation period is used as a feature".

The accuracy may be evaluated by an index that is generally used in data analysis, such as an F-measure or an AUC. The accuracy may be in terms of absolute value, or an index on the basis of a combination of points of views other than the accuracy, such as a processing time and a data amount, may also be used. The diagram provides more convincing data to the user who desires to know the reason "why the Total store visit day within the last 30 days is output instead of the Total store visit day within the last 20 days or 40 days". In addition, when it is desired to "decrease an amount of data to be accumulated as much as possible if the accuracy does not greatly vary", the diagram provides a determination criterion by illustrating the degree of influence of the data amount.

Figure 20:
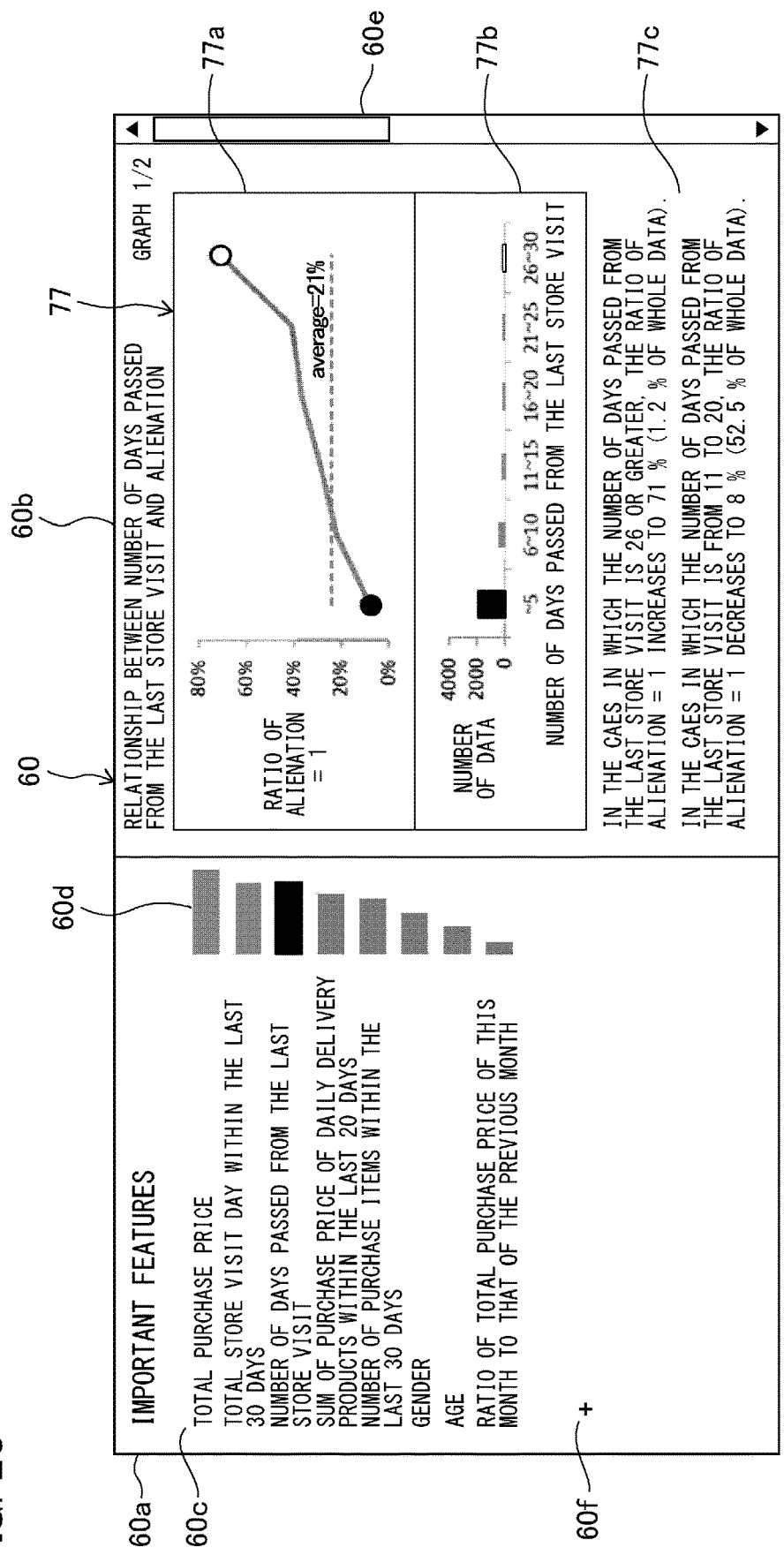
FIG. 20 shows the feature display user interface in a case of selecting a feature "Number of days passed from the last store visit"

FIG. 20 shows a case of selecting the feature "Number of days passed from the last store visit" from among the features displayed in the feature display region 60a of the feature display user interface 60. The detailed information display region 60b of the feature display user interface 60 displays a second basic diagram 77. The second basic diagram 77 is generated by the basic diagram generating part 16a of the display diagram generating unit 16 shown in FIG. 2. This process is the basic diagram generating step. That is, the basic diagram generating part 16a generates a basic diagram that shows a relationship between a first feature and the objective variable. The first feature is selected in accordance with an input of the user, from among the features displayed in the monitor 3. In the example shown in FIG. 20, the first feature is the feature "Number of days passed from the last store visit".

The second basic diagram 77 is divided into three areas of an upper area 77a, a middle area 77b, and a lower area 77c. The upper area 77a displays a line graph showing the ratio of alienation on the vertical axis and the number of days passed from the last store visit on the lateral axis. The lateral axis shows the number of days passed from the last store visit by dividing 30 days into six periods or six intervals.

The middle area 77b displays a bar graph showing the number of data on the vertical axis and the number of days passed from the last store visit on the lateral axis. The lateral axis of the bar graph is shared with the lateral axis of the line graph displayed in the upper area 77a. The lower area 77c displays an explanatory note that is automatically generated by the explanatory note automatically generating unit 18.

Also in the example shown in FIG. 20, the relationship between the selected feature and the objective variable is displayed. However, the highlighted series of the feature and the content of the explanatory note described in the lower area 77c differ from those in the example shown in FIG. 16, in correspondence with the characteristics of the features.

Figure 21:
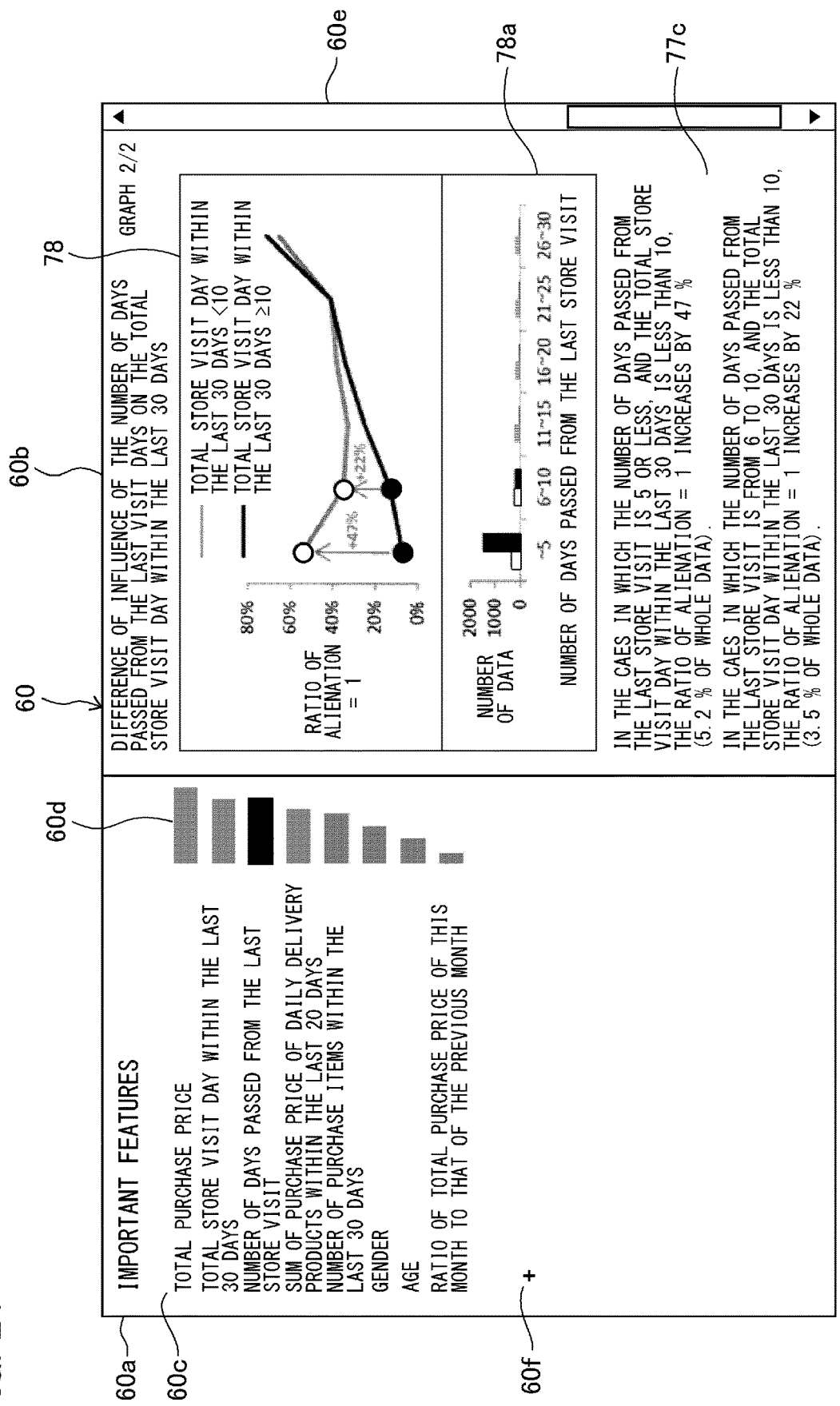
FIG. 21 shows the feature display user interface showing an influence degree comparison graph.

A second graph for explaining details of the features is exemplified by an influence degree comparison graph 78 that shows a combined influence of the feature and another feature, as shown in FIG. 21. A graph such as the influence degree comparison graph 78 may also be generated. The graph 78 shows a first feature and a second feature at the same time, and thus, the graph 78 may also be called a "simultaneously display graph". The generated simultaneously display graph may be displayed on the monitor 3. The influence degree comparison graph 78 may be displayed at the same time with the second basic diagram 77 or may be displayed at a time different from the time the second basic diagram 77 is displayed. The step for displaying the influence degree comparison graph 78 and the second basic diagram 77 is the derived diagram displaying step.

The influence degree comparison graph 78 may also be called a "first derived diagram". The first derived diagram shows a relationship between a second feature and an objective variable. The second feature is selected as follows. That is, the analysis target data is divided into a plurality of clusters on the basis of values of the first feature. A representative value of the objective variable of each of the clusters is calculated. Then, a second feature having a representative value of the objective variable, which is determined as having a significant difference relative to the representative value of the objective variable of the first feature, is extracted from at least one of the clusters. In this example, the first feature is the feature "Number of days passed from the last store visit", and the second feature is the feature "Total store visit day within the last 30 days". The first derived diagram is generated by the derived diagram generating unit 16b shown in FIG. 2. This process is the derived diagram generating step.

That is, in the case in which the derived diagram generating unit 16b shown in FIG. 2 generates the influence degree comparison graph 78 as shown in FIG. 21 as a first derived diagram, for example, a first feature of which values are divided into a plurality of periods is obtained, and a representative value, such as an average or a median, of an objective variable of each period is calculated. Then, a second feature having a representative value of the objective variable, which has a significant difference relative to the representative value of the objective variable of the first feature is extracted from any of the periods. A relationship between this second feature and the objective variable is thus shown. This provides a knowledge that is hard to acquire only by using the first feature. The condition for dividing the analysis target data may also be called an "interval", and the interval may be, for example, gender, place, or another element, instead of period.

The derived diagram generating unit 16b divides the analysis target data into a plurality of clusters on the basis of the values of the first feature and generates a data number display graph 78a that shows the number of pieces of data in the analysis target data belonging to each of the clusters. In dividing the analysis target data into a plurality of clusters, the derived diagram generating unit 16b obtains the total accumulation period of the analysis target data and automatically divides the obtained total accumulation period into a plurality of accumulation periods. This saves time and labor for dividing the analysis target data by the user.

The data number display graph 78a is exemplified by a bar graph displayed under the first derived diagram or the influence degree comparison graph 78. The monitor 3 may display the data number display graph 78a generated by the derived diagram generating unit 16b. The data number display graph 78a enables facilitating understanding, the number of pieces of data in the analysis target data.

In addition, existence of a cluster having pieces of data in the analysis target data at a first predetermined number or less may be notified to the user. For example, in a case in which there is a cluster having a number of pieces of data of several percent or less of the total number of pieces of data, this is informed to the user to prompt determination of reliability of the feature of the cluster.

The derived diagram generating unit 16b determines, at the time of generating the first derived diagram, that a feature having pieces of data in the analysis target data at a second predetermined number or less has no significant difference relative to the representative value of the objective variable of the first feature. The second predetermined number may be the same as the first predetermined number or one may be smaller than the other. For example, in a case in which there is a feature of which the number of pieces of data is several percent or less of the total number of pieces of data, the objective variable may be considered as having low reliability. In such a case, it is determined that there is no significant difference in order to prevent using this feature in analysis.

The influence degree comparison graph 78 implies that a great difference occurs in the objective variable of the selected feature by dividing the data using another feature, although the data is in the same interval. The line graph that is displayed in the upper area 77a shown in FIG. 20 shows a fact that "as the number of days passed from the last store visit decreases, the ratio of the alienation=1 decreases". Further, the influence degree comparison graph 78 shown in FIG. 21 provides a new knowledge, that is, "the alienation rate of the customer whose total store visit day is less than 10 days is high even though the number of days passed from the last store visit is small".

The difference between the values of the another feature in an interval is examined whether it is significant, and only the interval in which the difference is determined as being significant is highlighted in the influence degree comparison graph 78. In this example, the feature "Total store visit day within the last 30 days" is combined with the selected feature. If a graph of a combination of every other feature and the selected feature is displayed, the number of the graphs is enormous.

In view of this, the value of the above-described difference is calculated with respect to the combination of every other feature and the selected feature, and only the combination by which a highly significant difference is generated is displayed. The influence degree comparison graph 78 is not described in relation to the example shown in FIG. 16. The reason for this is that a significant difference is not generated in the series in evaluating any combinations. That is, the influence degree comparison graph 78 may be automatically generated and displayed when a significant difference occurs in the series.

At this time, the feature to be combined may be a feature with a high degree of importance or a feature with a low degree of importance and is determined regardless of the degree of importance.

The interval for dividing the values of the combined feature may be selected so that the significance will be the highest, by examining significances in each of various dividing methods. In the case shown in FIG. 21, the interval is 5 days. For example, a significance may be tested in both of a case of dividing the values of the combined feature by 5 days and a case of dividing the values of the combined feature by 10 days. This dividing method using intervals may be automatically performed by the control unit 10 or may be manually performed by the user.

Figure 22:
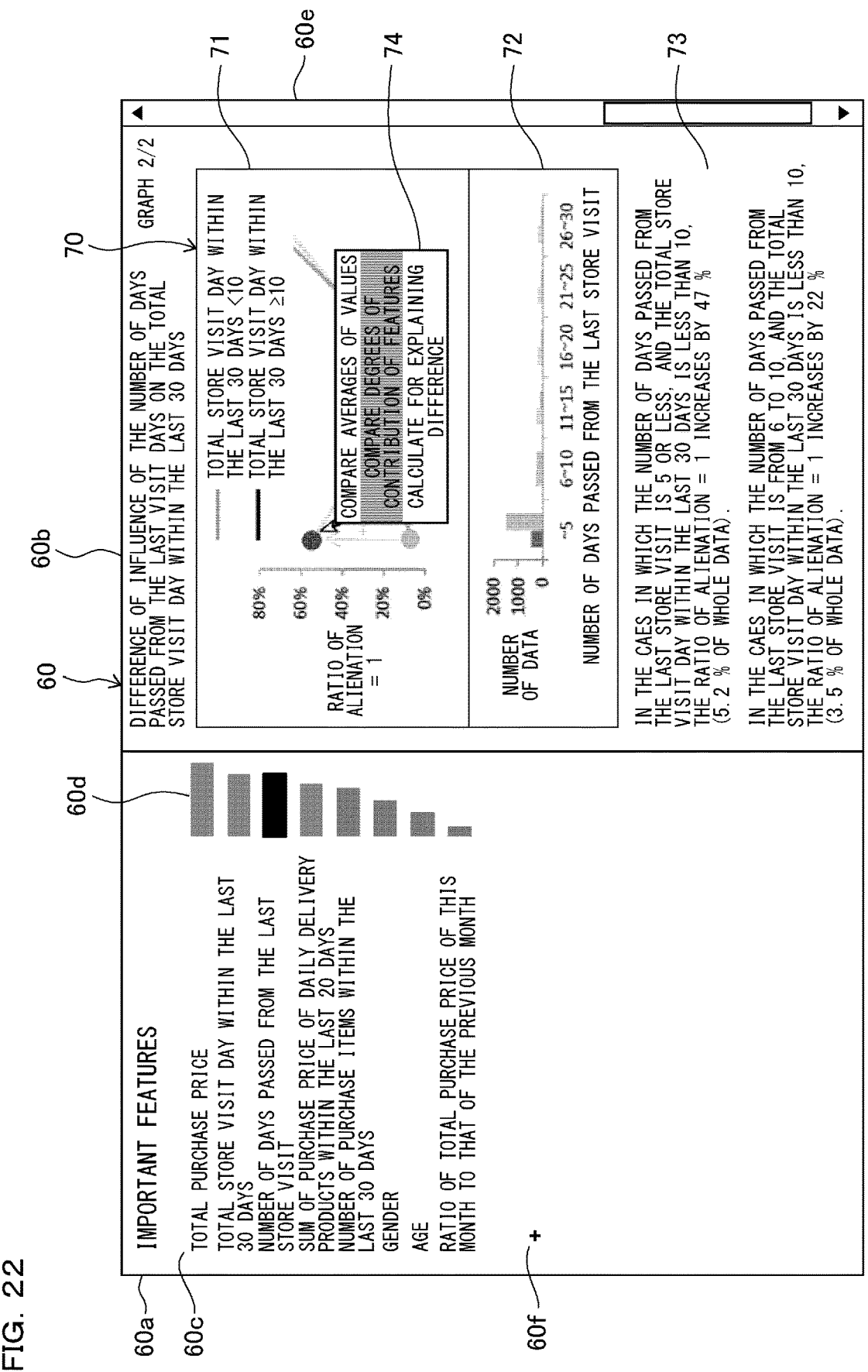
FIG. 22 shows the feature display user interface in a case of selecting a menu item "Compare degrees of contribution of features" in the detailed menu.
Figure 23:
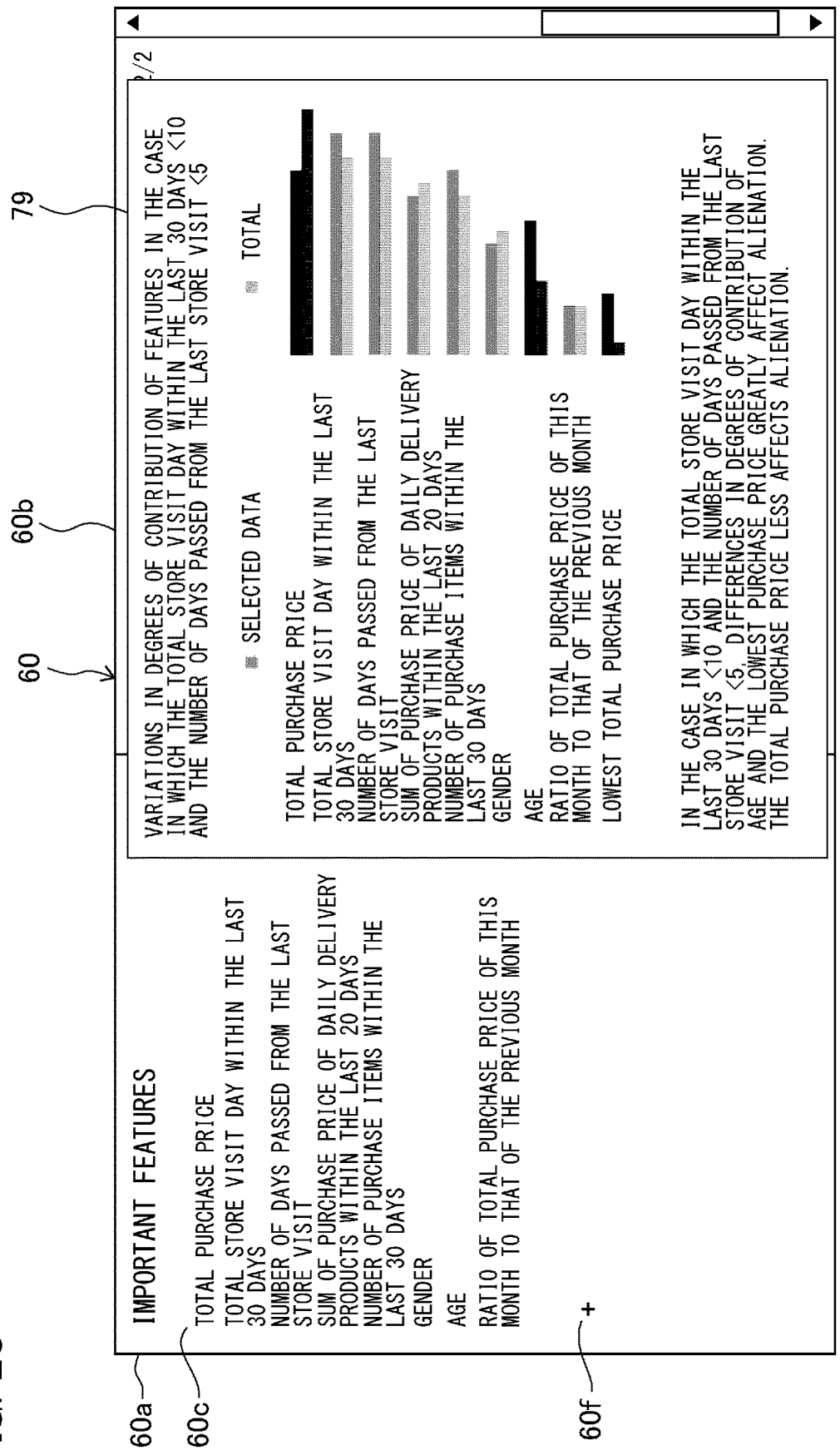
FIG. 23 shows the feature display user interface showing a contribution degree graph.

FIG. 22 shows the feature display user interface 60 in a situation in which any interval is selected in the graph displayed in the upper area 71 to display the detailed menu 74, and the menu item "Compare degrees of contribution of features" is selected in the detailed menu 74. In response to this selection, a contribution degree display graph 79 as shown in FIG. 23 is displayed in the feature display user interface 60. The contribution degree display graph 79 shows a comparison of the degrees of contribution of the features between the selected data group and the whole data and corresponds to a comparison diagram. Thus, the contribution degree display graph 79 is generated by the comparison diagram generating unit 16c. This step is a comparison diagram generating step. In addition, the contribution degree display graph 79 and the second basic diagram 77 may be displayed on the monitor 3 at the same time or at different times. The process for displaying the contribution degree display graph 79 and the second basic diagram 77 at the same time or at different times is the contribution diagram displaying step.

A calculation method of the degree of contribution of a feature is described in detail below. An analysis method called a "multiple linear regression" uses a prediction formula (2) represented by the following form.

$$y = a1x1 + a2x2 + a3x3 + \ldots + anxn + b \quad (2)$$

The symbol "y" is a prediction value, the symbols "x1", "x2", . . . , are values or explanatory variables of respective features, and the symbols "a1", "a2", . . . , are coefficients relative to the respective features. In addition, the symbol "b" is a constant term. In the multiple regression analysis, the coefficient "a" and the constant term "b" are learned so that the value of "y" will approach the objective variable in each data.

As shown in the formula (2), the prediction value "y" is the sum of the term relating to the respective features, which are a1x1, a2x2, . . . , and the constant term. A feature with a greater absolute value of the term is considered as having a larger influence on the perdition.

From this point of view, the product of aixi of the coefficient and the value of a feature is defined as a degree of contribution of a feature "i". The degrees of contribution to prediction of a plurality of data are averaged, whereby an average degree of contribution to prediction of any data group is calculated.

FIG. 24 shows an example in which y=3x1−2x2+1. In this case, assuming that an average is obtained by using four data, the feature x1 has a slightly plus value for the degree of contribution relative to the prediction value, whereas the feature x2 has a large minus value for the degree of contribution relative to the prediction value.

In this example, a procedure for calculating the degree of contribution by means of multiple linear regression using the above-described formula is described. However, a similar calculation may also be performed by approximation using a linear model relative to each prediction although a non-linear algorithm is used. An example is disclosed in, Scott M. Lundberg, "Consistent Individualized Feature Attribution for Tree Ensembles" (2018).

The degree of contribution that is thus defined is calculated with respect to the selected data and also to the whole data, and the results are compared in the contribution degree display graph 79 shown in FIG. 23. The contribution degree display graph 79 shows tendencies such as "The lowest purchase price of the whole data does not greatly affect the alienation of the whole data, but the lowest purchase price of the target data group greatly affects the alienation" and "However, the influence of the total purchase price is still greater than that of the lowest purchase price". These are obtained as new knowledges.

This example shows only two types of features, that is, a feature having a higher degree of importance and a feature having a significantly high degree of contribution only in the selected data group, which is the lowest purchase price. However, other than that, only a feature having a significantly high difference in the degree of contribution may also be displayed. It is also possible that the user deletes the feature to be displayed.

Figure 25:
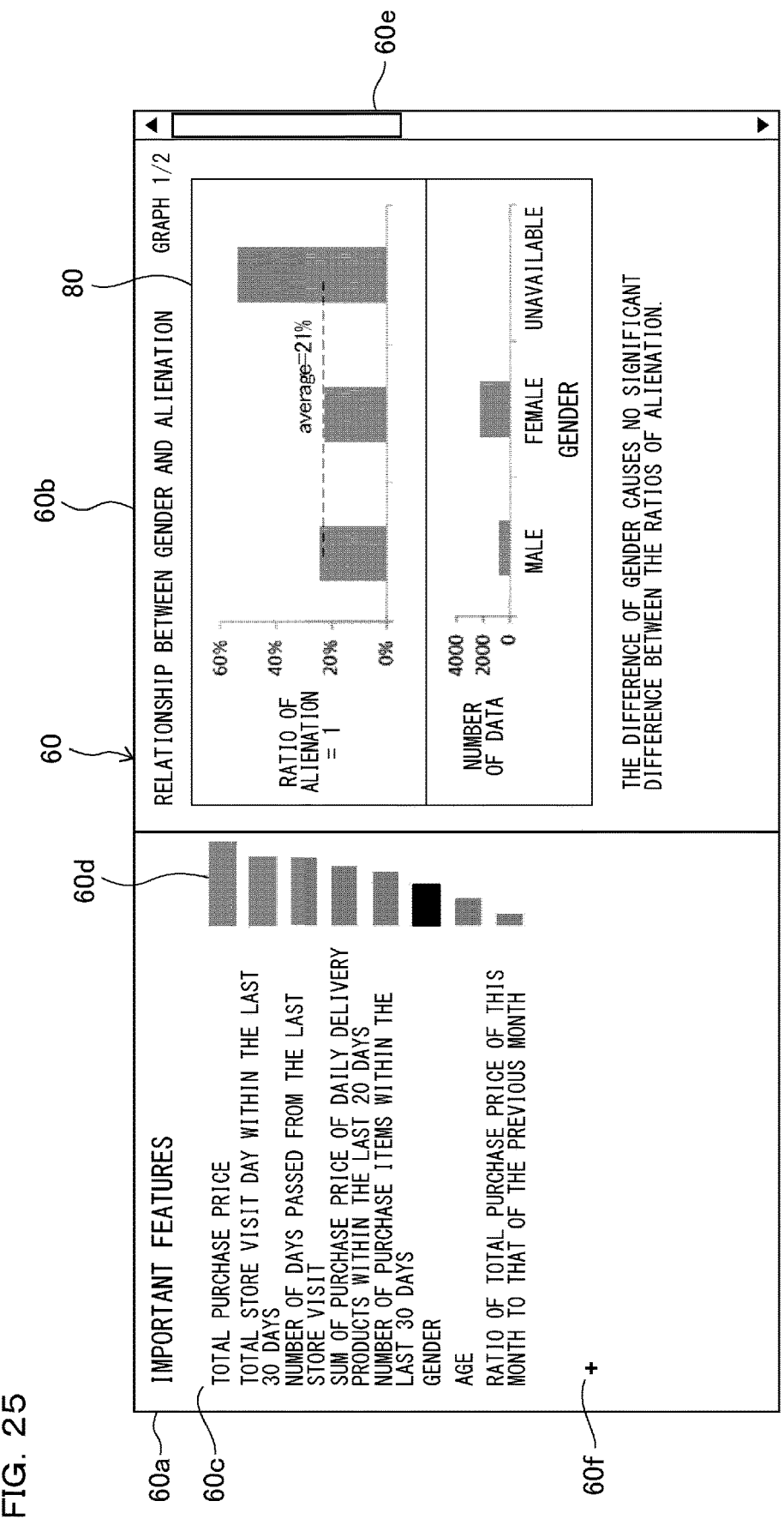
FIG. 25 shows the feature display user interface displayed in a case of selecting a feature "Gender"

The feature "Gender" may be selected from among the features displayed in the feature display region 60a of the feature display user interface 60 shown in FIG. 15. In response to this, a third basic diagram 80 as shown in FIG. 25 is displayed in the feature display user interface 60. The third basic diagram 80 is generated by the basic diagram generating part 16a of the display diagram generating unit 16 shown in FIG. 2. This process is the basic diagram generating step. The third basic diagram 80 shows the feature that is not represented by values unlike the examples shown in FIGS. 16 and 20, and therefore, the format of the graph is changed to a bar graph format in the third basic diagram 80. In this case, the series "Unavailable" represents a condition of having no value in the original analysis target data. In the example shown in FIG. 25, the graph is displayed without highlighting any series because there is no significant difference in the value of the objective variable between genders. However, the graph may be displayed with highlighting when there is a significant difference.

Figure 26:
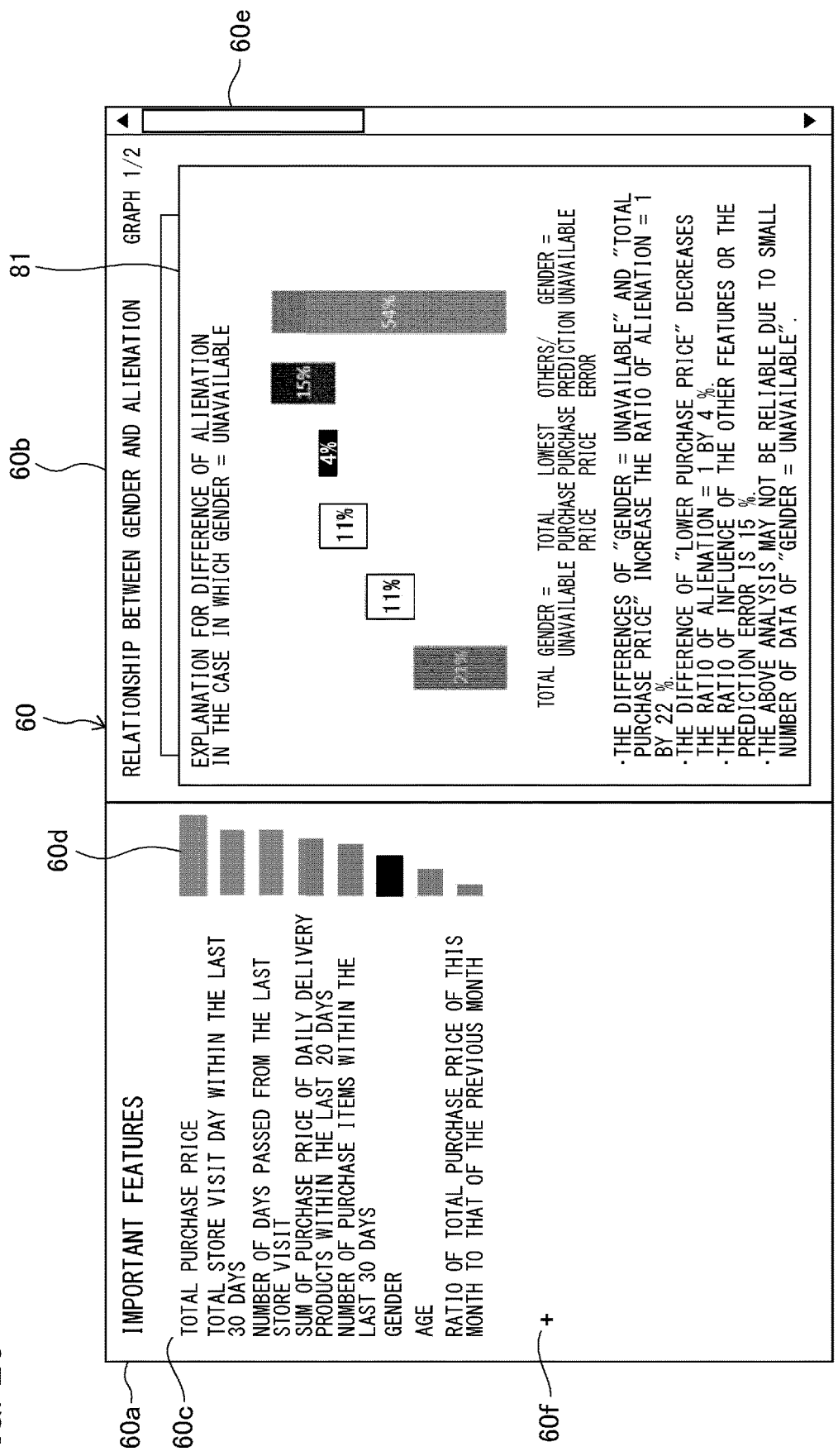
FIG. 26 shows the feature display user interface showing a difference explanatory graph.

In these conditions, the series "Unavailable" shown in FIG. 25 is selected to display a detailed menu 74 as shown in FIG. 17, and the menu item "Calculate for explaining difference" is selected in the detailed menu 74. In response to this, a difference explanatory graph 81 as shown in FIG. 26 is displayed in the feature display user interface 60. The difference explanatory graph 81 shows which feature contributes most to the difference in the value of the objective variable between the selected data group and the whole data and corresponds to a comparison diagram. Thus, the difference explanatory graph 81 as shown in FIG. 26 is generated by the comparison diagram generating unit 16c. This step is the comparison diagram generating step. In addition, the difference explanatory graph 81 and the third basic diagram 80 may be displayed on the monitor 3 at the same time or at different times. The process for displaying the difference explanatory graph 81 and the third basic diagram 80 at the same time or at different times is the comparison diagram displaying step. The calculation for the explanation uses the value of the degree of contribution.

The calculation method for explaining the difference is described below. First, the degree of contribution is calculated with respect to each feature in the whole data and in the selected data group.

$$y\_all = B1all + B2all + B3all + \ldots + Bnall + b \quad (3)$$

$$y\_sel = B1sel + B2sel + B3sel + \ldots + Bnsel + b \quad (4)$$

The symbols "y_all" and "y_sel" respectively represent average prediction values of the whole data and the selected data. The symbols "Biall" and "Bisel" respectively represent degrees of contribution of the ith feature of the whole data and the selected data.

The result of subtracting the formula (3) from the formula (4) is as follows.

$$y\_sel = y\_all + (B1sel - B1all) + (B2sel - B2all) + \ldots + (Bnsel - Bnall) \quad (5)$$

The second term and the subsequent terms on the right side represent differences in the degree of contribution between the selected data and the whole data. The second term and the subsequent terms on the right side are respectively represented as Di. The values "y_sell" and "y_all" are expected to include prediction errors relative to true average values of the objective variables "y_sel_true" and "y_all_true", respectively.

$$y\_sel\_true = y\_sel + \delta\_sel \quad (6)$$

$$y\_all\_true = y\_all + \delta\_all \quad (7)$$

The formulas (6) and (7) are substituted into the formula (5), whereby the following formula (8) is obtained.

$$y\_sel\_true = y\_all\_true + D1 + D2 + \ldots Dn + (\delta\_all - \delta\_sel) \quad (8)$$

The formula (8) shows that the average "y_sel_true" of the objective variable of the selected data is the sum of three elements: the average of the objective variable of the whole data, the differences in the degree of contribution of respective features, and the prediction error.

The above-described graph shows individual features having particularly large values among the differences in the degree of contribution D1, D2, . . . , and collectively shows other elements and the prediction error by a series "Others/prediction error".

Thus, the graph 81 for explaining the difference in the objective variable by the differences in the degree of contribution is displayed. This provides insights into why the alienation rate of the user group of "gender=unavailable" is such a high value as 54%. That is, the high alienation rate of the user group of "gender=unavailable" is partially affected by the feature "total purchase price", but approximately 15% of the differences is difficult to explain by the difference of the main feature.

However, in consideration that the series "gender=unavailable" is not highlighted in the first place, there is not enough information to determine that the high alienation rate in the series "gender=unavailable" is significant, and the above insight may be incorrect. A note for urging consideration of this is also displayed in the graph 81.

Figure 27:
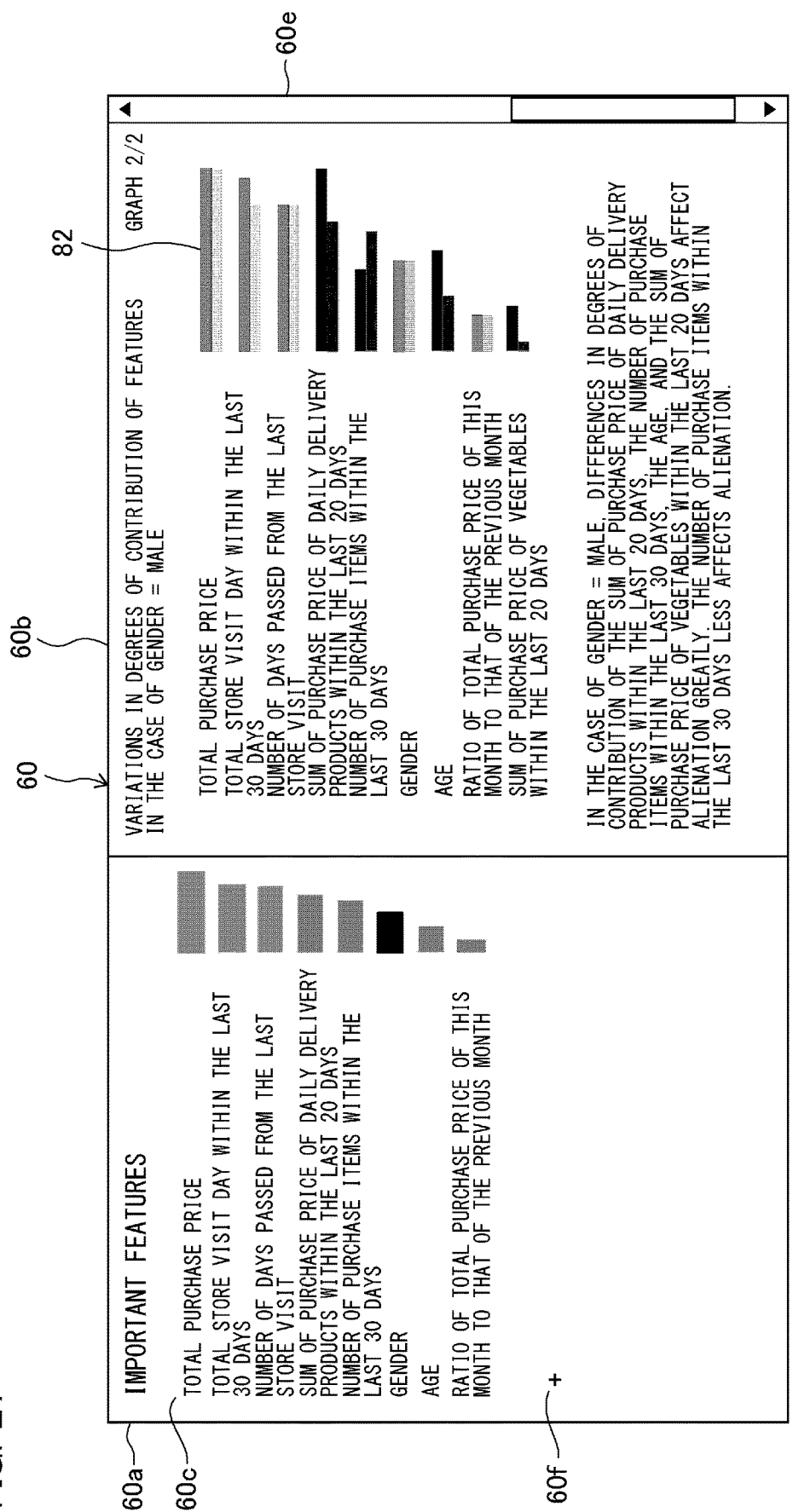
FIG. 27 shows the feature display user interface showing a graph relating to variations in degrees of contribution of features.

Moreover, a graph 82 relating to changes in the degrees of contribution of the features may also be displayed as shown in FIG. 27 as another graph for explanation relating to gender. This graph is the same type as the graph that is displayed by clicking the graph in the example shown in FIG. 20, and this graph is based on gender.

The graph 82 shown in FIG. 27 may also be called a "second derived diagram". The second derived diagram shows features that contribute to the prediction of the objective variable in a predetermined cluster among a plurality of clusters. The cluster is the same as that for the first derived diagram. In this example, the clusters are a cluster "Male", a cluster "Female", and a cluster "Unavailable". However, the cluster may be a period. The second derived diagram is generated by the derived diagram generating unit 16b shown in FIG. 2. This process is the derived diagram generating step. After the derived diagram generating step, the derived diagram displaying step for displaying the basic diagram and the second derived diagram at the same time or at different times may be executed.

In this example, features that contribute to the prediction of the objective variable in the predetermined cluster and a first feature of the all clusters may be displayed at the same time.

When the derived diagram generating unit 16b generates the second derived diagram, in the condition in which the analysis target data may be divided into clusters of "Male" and "Female" as described above, the degree of contribution to the prediction of the objective variable may greatly vary depending on gender. Showing such a feature that contributes to the prediction of the objective variable provides a new knowledge.

The graph shown in FIG. 27 provides a knowledge such that "The gender alone does not affect the average of the objective variable, but the degrees of contribution of other features greatly vary depending on gender, and as a result, the gender is an important feature".

Effects of Embodiment

As described above, the data analyzing device 1 and the data analyzing method according to this embodiment enable displaying a feature with a high degree of importance included in a large volume of data, on the monitor 3. Various kinds of graphs may be displayed on the monitor 3. The graphs include the basic diagram showing a relationship between a feature and an objective variable, the derived diagram showing a relationship between a plurality of features and an objective variable, the derived diagram showing features that contribute to prediction of an objective variable in a predetermined cluster, and the derived diagram that shows a comparison of accuracy between prediction models generated based on features that have different accumulation periods.

It is possible to know the relationship of representative values of the objective variable between clusters that are obtained by dividing analysis target data. It is also possible to compare a feature that contributes to prediction of the objective variable in a selected cluster with a feature that contributes to prediction of the objective variable in all clusters or a cluster other than the selected cluster. Thus, the data analyzing device 1 and the data analyzing method according to this embodiment facilitate acquiring a new knowledge.

OTHER EMBODIMENTS

The forgoing embodiment is merely an illustration in every aspect and should not be limitedly understood. Moreover, all modifications and alterations belonging to equivalents of the claims are considered to fall within the scope of the present invention.

Although the foregoing embodiment uses a line graph and a bar graph for showing the relationship between the objective variable and the feature, a scatter plot graph or other expression methods may also be used. In the case of using a scatter plot graph, a part of the data may be selected by dragging an area in the graph instead of clicking a series in the graph, to further display a detailed graph.

Any one of the first derived diagram exemplified by the influence degree comparison graph 78 shown in FIG. 21, the second derived diagram exemplified by the graph 82 relating to changes in the degrees of contribution of the features shown in FIG. 27, and the third derived diagram exemplified by the prediction accuracy comparison graph 76 shown in FIG. 19 and the basic diagrams 70, 77, or 80 may be displayed on the monitor 3 at the same time or at different times. The derived diagram generating unit 16b may generate all of the first derived diagram, the second derived diagram, and the third derived diagram, and the order of generation is not particularly limited. In addition, all of the first derived diagram, the second derived diagram, and the third derived diagram may be displayed on the monitor 3 at the same time.

Although the three basic diagrams 70, 77, and 80 are described in this embodiment, the basic diagram generating unit 16a generates a diagram in correspondence with a feature selected by the user. To switch the basic diagrams 70, 77, or 80 and the first derived diagram, the second derived diagram, or the third derived diagram on the display, an operation means such as a screen switching button may also be used.

As described above, the data analyzing device and the data analyzing method according to the present invention can be used in trying to acquire a useful unknown knowledge from a large volume of information.

What is claimed is:

1. A data analyzing device for analyzing analysis target data, the data analyzing device comprising:
   a data input unit which receives an input of analysis target data including a plurality of features and an objective variable;
   a prediction model generating unit which generates a prediction model for predicting the objective variable from the plurality of features;
   an importance degree calculating unit which calculates a degree of importance of each of the plurality of features relative to prediction using the prediction model;
   a display unit which displays features having higher degrees of importance on a basis of the degrees of importance calculated by the importance degree calculating unit;
   a basic diagram generating unit which generates a basic diagram that shows a relationship between a first feature and the objective variable, the first feature being selected in accordance with an input of a user from among the features displayed on the display unit; and
   a derived diagram generating unit which generates at least one of a first derived diagram, a second derived diagram, and a third derived diagram,
   the first derived diagram showing a relationship between a second feature and the objective variable, the second feature being selected as follows: the analysis target data is divided into a plurality of clusters on a basis of values of the first feature, a representative value of the objective variable of each of the clusters is calculated, and a second feature having a representative value of the objective variable, which is determined as having a significant difference relative to the representative value of the objective variable of the first feature, is extracted from at least one of the clusters,
   the second derived diagram showing a feature that contributes to prediction of the objective variable in a predetermined cluster among the plurality of clusters, and
   the third derived diagram showing a comparison of accuracy between a prediction model generated based on the first feature and a prediction model generated based on another feature belonging in the same category as the first feature and having an accumulation period different from that of the first feature;
   wherein the display unit is configured to display the basic diagram generated by the basic diagram generating unit and the derived diagram generated by the derived diagram generating unit.

2. The data analyzing device according to claim 1, wherein the display unit is configured to display a plurality of features having higher degrees of importance in the order of higher degree of importance.

3. The data analyzing device according to claim 2, wherein the display unit is configured to display a feature having a highest degree of importance and a plurality of features having degrees of importance less than the highest degree of importance, at the same time.

4. The data analyzing device according to claim 1, wherein the derived diagram generating unit enables, at the time of generating the third derived diagram, comparing accuracies of prediction models respectively generated based on the plurality of other features with the accuracy of the prediction model generated based on the first feature.

5. The data analyzing device according to claim 4, wherein the derived diagram generating unit enables, at the time of generating the third derived diagram, comparing an accuracy of a prediction model generated based on the another feature having a degree of importance equal to or greater than a predetermined value with the accuracy of the prediction model generated based on the first feature.

6. The data analyzing device according to claim 1, wherein the derived diagram generating unit is configured to generate a data number display graph that shows the number of pieces of data in the analysis target data belonging to each cluster, and the display unit is configured to display the data number display graph generated by the derived diagram generating unit.

7. The data analyzing device according to claim 6, wherein the derived diagram generating unit is configured to notify a user of existence of a cluster having pieces of data in the analysis target data at a first predetermined number or less.

8. The data analyzing device according to claim 1, wherein the derived diagram generating unit is configured to obtain a total accumulation period of the analysis target data and automatically divide the obtained total accumulation period into a plurality of accumulation periods.

9. The data analyzing device according to claim 1, wherein the derived diagram generating unit is configured to determine, at the time of generating the first derived diagram, that a feature having pieces of data in the analysis target data at a second predetermined number or less has no significant difference relative to the representative value of the objective variable of the first feature.

10. The data analyzing device according to claim 1, wherein the derived diagram generating unit is configured to generate, at the time of generating the first derived diagram, a simultaneously display graph that shows the first feature and the second feature at the same time, and the display unit is configured to display the simultaneously display graph generated by the derived diagram generating unit.

11. The data analyzing device according to claim 1, wherein the derived diagram generating unit is configured to generate the second derived diagram showing the feature that contributes to the prediction of the objective variable in the predetermined cluster and the first feature of the all clusters, at the same time.

12. The data analyzing device according to claim 1, further comprising an explanatory note automatically generating unit that automatically generate an explanatory note for explaining a relationship between the first feature and the objective variable.

13. A data analyzing method for analyzing analysis target data, the data analyzing method comprising:
receiving an input of analysis target data including a plurality of features and an objective variable;
generating a prediction model for predicting the objective variable from the plurality of features;
calculating a degree of importance of each of the plurality of features relative to prediction using the prediction model;
displaying features having higher degrees of importance on a basis of the calculated degrees of importance;
generating a basic diagram that shows a relationship between a first feature and the objective variable, the first feature being selected in accordance with an input of a user from among the displayed features;
generating at least one of a first derived diagram, a second derived diagram, and a third derived diagram, the first derived diagram showing a relationship between a second feature and the objective variable, the second feature being selected as follows: the analysis target data is divided into a plurality of clusters on the basis of values of the first feature, a representative value of the objective variable of each of the clusters is calculated, and a second feature having a representative value of the objective variable, which is determined as having a significant difference relative to the representative value of the objective variable of the first feature, is extracted from at least one of the clusters, the second derived diagram showing a feature that contributes to prediction of the objective variable in a predetermined cluster among the plurality of clusters, and the third derived diagram showing a comparison of accuracy between a prediction model generated based on the first feature and a prediction model generated based on another feature belonging in the same category as the first feature and having an accumulation period different from that of the first feature; and
displaying the generated basic diagram and the generated derived diagram.

\* \* \* \* \*